US010975103B2

United States Patent
Tadaoka et al.

(10) Patent No.: US 10,975,103 B2
(45) Date of Patent: *Apr. 13, 2021

(54) COMPLEX AND PROCESS FOR PREPARING COMPLEX

(71) Applicant: Sumitomo Rubber Industries, Ltd., Kobe (JP)

(72) Inventors: Hiroshi Tadaoka, Kobe (JP); Chiemi Mikura, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,608

(22) Filed: Jun. 24, 2019

(65) Prior Publication Data

US 2019/0389884 A1 Dec. 26, 2019

(30) Foreign Application Priority Data

Jun. 25, 2018 (JP) .............................. JP2018-120087

(51) Int. Cl.
*C07F 3/00* (2006.01)

(52) U.S. Cl.
CPC .................... *C07F 3/003* (2013.01)

(58) Field of Classification Search
None
See application file for complete search history.

(56) References Cited

U.S. PATENT DOCUMENTS

2018/0185706 A1* 7/2018 Tadaoka ............... C07F 3/06

FOREIGN PATENT DOCUMENTS

JP 1-245859 A 10/1989

OTHER PUBLICATIONS

Gordon et al., "Preparation and properties of tetrazinc μ4-oxohexa-μ-carboxylates (basic zinc carboxylates)," Canadian Journal of Chemistry, vol. 61, 1983, pp. 1218-1221.

(Continued)

*Primary Examiner* — Clinton A Brooks
(74) *Attorney, Agent, or Firm* — Birch, Stewart, Kolasch & Birch, LLP

(57) ABSTRACT

An object of the present invention is to provide a novel complex having at least two carbon-carbon double bonds and/or carbon-carbon triple bonds. The present invention provides a complex represented by a structural formula (2):

[In the structural formula (2), $M^1$ to $M^4$ are identical to or different from each other and represent a metal atom, $R^1$ to $R^6$ are identical to or different from each other and represent a hydrogen atom, an alkyl group having 1 to 24 carbon atoms, an alkenyl group having 2 to 18 carbon atoms or an alkynyl group having 2 to 18 carbon atoms, at least two of $R^1$ to $R^6$ are the alkenyl group having 2 to 18 carbon atoms (Continued)

or the alkynyl group having 2 to 18 carbon atoms, and at least one of $R^1$ to $R^6$ is the alkyl group having 6 to 24 carbon atoms].

16 Claims, 8 Drawing Sheets

(56) References Cited

OTHER PUBLICATIONS

New Series of Experimental Chemistry, 1st Edition (Mar. 20, 1977), vol. 8, p. 986.
Ötvös et al., "Synthesis and Spectroscopic and Computational Characterization of Zn4O(Alicyclic or Aromatic Carboxylate)6 Complexes as Potential MOF Precursors," Inorganic Chemistry, vol. 49, 2010, pp. 4620-4625.

\* cited by examiner

COMPLEX AND PROCESS FOR PREPARING COMPLEX

FIELD OF THE INVENTION

The present invention relates to a complex, more specifically, a complex having a reactive functional group. Further, the present invention relates to a process for preparing a complex.

DESCRIPTION OF THE RELATED ART

Japanese Patent Publication No. H1-245859 A discloses a macro porous ion selective exchange resin obtained by a crosslinking polymerization of a well-defined polymerizable metal complex, wherein the macro porous ion selective exchange resin is obtained by reacting a metal complex represented by a general formula of MaLbBcXd (1) with a monomer having at least two polymerizable carbon-carbon multiple bonds and/or an oligomer crosslinking agent (In the formula, M represents a main group metal and/or a sub group metal, L represents a polymerizable ligand, B represents a non-polymerizable ligand, X represents a non-polymerizable anion, a represents an integer of 1 to 6, b represents an integer of 1 to 8, c represents an integer of 0 to 4, and d represents an integer of 0 to 6).

New Experimental Chemical Lecture, Edition 1$^{st}$, Volume 8$^{th}$, p. 986 discloses a process for preparing tetrazinc monoxide hexaacetate by heating zinc acetate (II) in vacuum.

Inorganic Chem. 2010, 49, 4620-4625 discloses a process for preparing $Zn_4O$ carboxylate by reacting a carboxylic acid with zinc oxide in carbon tetrachloride.

Can. J. Chem. 1983, 61, 1218 discloses a process for preparing a basic zinc 2-ethylhexanoate by reacting zinc oxide with zinc 2-ethylhexanoate in toluene.

SUMMARY OF THE INVENTION

An object of the present invention is to provide a novel complex having at least two carbon-carbon double bonds and/or carbon-carbon triple bonds. In addition, if a conventional preparing process is used to prepare the novel complex having at least two carbon-carbon double bonds and/or carbon-carbon triple bonds, there is a problem that the carbon-carbon double bonds and/or the carbon-carbon triple bonds are self-polymerized, thereby failing to obtain the target complex. The present invention has been made in view of the abovementioned circumstances, and an object of the present invention is to provide a novel preparing process for preparing a complex.

The present invention relates to a complex represented by a formula (1):

[In the formula (1), M is a metal atom, and R is a hydrogen atom, an alkyl group having 1 to 24 carbon atoms, an alkenyl group having 2 to 18 carbon atoms or an alkynyl group having 2 to 18 carbon atoms. In the formula (1), a plurality of R may be identical to or different from each other, at least two of R are the alkenyl group having 2 to 18 carbon atoms or the alkynyl group having 2 to 18 carbon atoms, at least one of R is the alkyl group having 6 to 24 carbon atoms, and n is an integer of 1 to 8].

The complex represented by the formula (1) is preferably a complex represented by a structural formula (2):

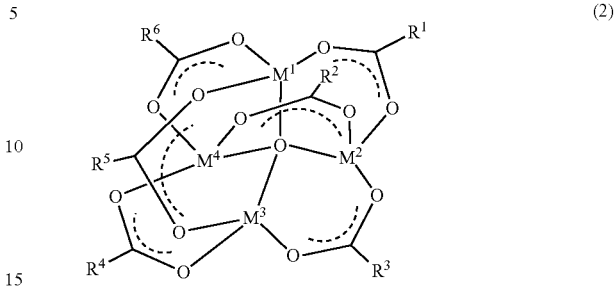

[In the structural formula (2), $M^1$ to $M^4$ are identical to or different from each other and represent a metal atom, $R^1$ to $R^6$ are identical to or different from each other and represent a hydrogen atom, an alkyl group having 1 to 24 carbon atoms, an alkenyl group having 2 to 18 carbon atoms or an alkynyl group having 2 to 18 carbon atoms, at least two of $R^1$ to $R^6$ are the alkenyl group having 2 to 18 carbon atoms or the alkynyl group having 2 to 18 carbon atoms, and at least one of $R^1$ to $R^6$ is the alkyl group having 6 to 24 carbon atoms].

In a preferable complex according to the present invention, in the structural formula (2), $M^1$ to $M^4$ are zinc, at least two of $R^1$ to $R^6$ are —CH=CH$_2$ or —C(CH$_3$)=CH$_2$, and at least one of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group (eicosyl group).

The present invention also provides a process for preparing a complex, comprising a step of reacting a compound represented by a formula (3-1), a compound represented by a formula (3-2), and a metal oxide represented by a formula (4) in a solvent:

 (3-1)

 (3-2)

 (4)

[In the formula (3-1), $M^5$ is a metal atom, $R^7$ is an alkenyl group having 2 to 18 carbon atoms or an alkynyl group having 2 to 18 carbon atoms, x is a number corresponding to oxidation number of the metal atom $M^5$ and is an integer of 2 or more, y is an integer of 0 or more, and a plurality of $R^7$ may be identical to or different from each other. In the formula (3-2), $M^6$ is a metal atom, $R^8$ is an alkyl group having 6 to 24 carbon atoms, x is a number corresponding to oxidation number of the metal atom $M^6$ and is an integer of 2 or more, y is an Integer of 0 or more, and a plurality of $R^8$ may be identical to or different from each other. In the formula (4), $M^7$ is a metal atom, a is an integer of 1 to 5, and b is an integer of 1 to 7].

Chloroform is preferably used as the solvent. A molar ratio (((3-1)+(3-2))/(4)) of the compound represented by the formula (3-1) and the compound represented by the formula (3-2) to the metal oxide represented by the formula (4) preferably ranges from 3/2 to 5/1.

The compound represented by the formula (3-1), the compound represented by the formula (3-2) and the metal oxide represented by the formula (4) are preferably reacted at a temperature in a range from −20° C. to 100° C.

The preparing process according to the present invention is suitable for a process for preparing the complex represented by the formula (1) and the complex represented by the structural formula (2).

According to the present invention, a novel complex having at least two carbon-carbon double bonds and/or carbon-carbon triple bonds is obtained. In addition, a novel preparing process for preparing a complex is provided.

DESCRIPTION OF THE PREFERRED EMBODIMENT

Figure 1:
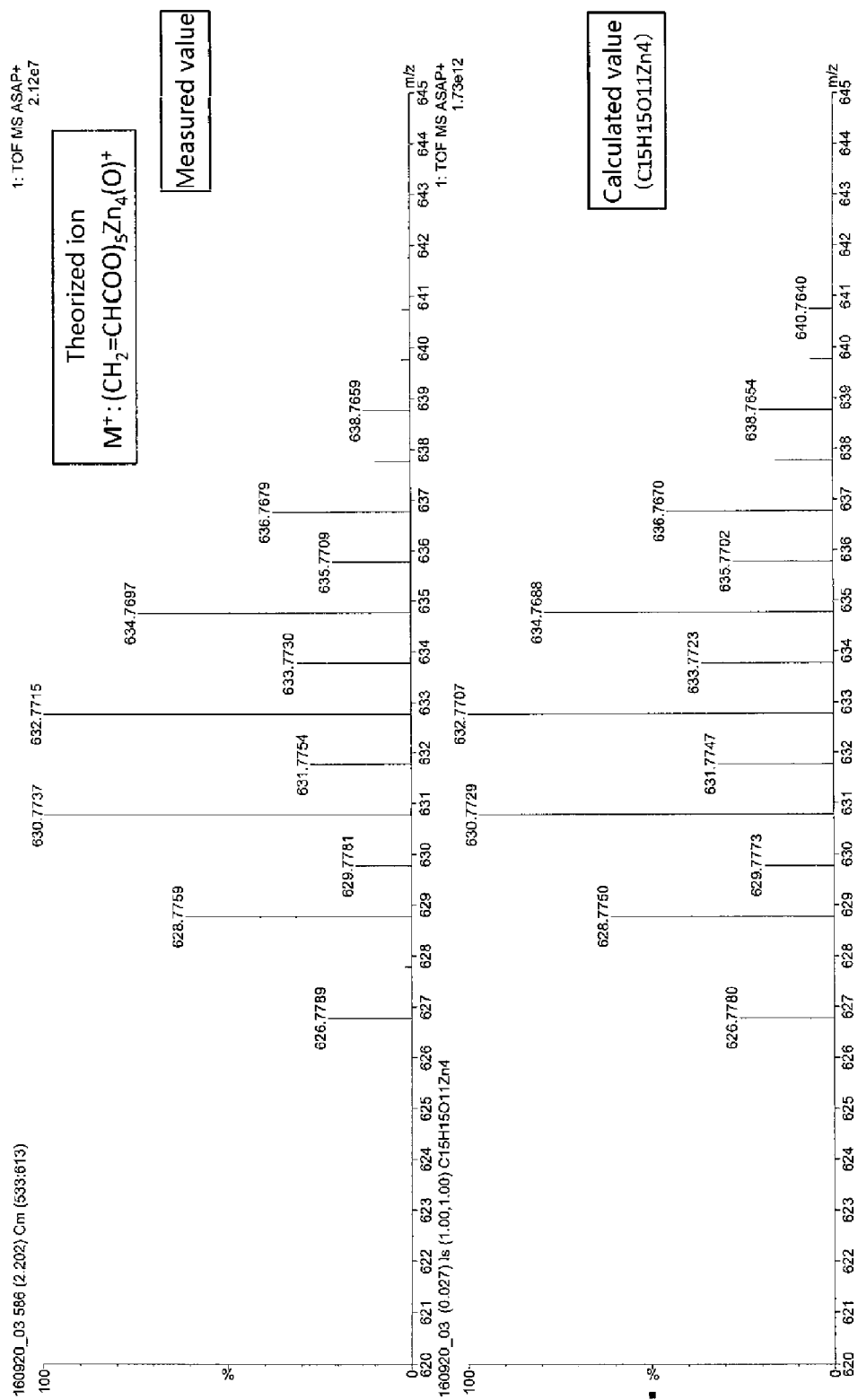
FIG. 1 shows ASAP-MS spectrum of zinc acrylate oxo cluster.

The present invention relates to a complex represented by a formula (1):

$$[M_4O(RCOO)_6]_n \quad (1)$$

[In the formula (1), M is a metal atom, O is an oxygen atom, RCOO is a carboxylate group, and R is a hydrogen atom, an alkyl group having 1 to 24 carbon atoms, an alkenyl group having 2 to 18 carbon atoms or an alkynyl group having 2 to 18 carbon atoms. In the formula (1), a plurality of R may be identical to or different from each other, at least two of R are the alkenyl group having 2 to 18 carbon atoms or the alkynyl group having 2 to 18 carbon atoms, at least one of R is the alkyl group having 6 to 24 carbon atoms, and n is an integer of 1 to 8].

A complex means a molecular compound having a metal atom or metal ion to which an atom or atomic group called a ligand is binding, and is also called a coordination compound.

Examples of the metal atom (M) include an alkali metal such as lithium, sodium, potassium, rubidium and cesium; an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. These metal atoms may be used solely, or at least two of them may be used. Among them, as the metal atom, beryllium, magnesium, calcium, zinc, barium, cadmium, lead, copper or nickel is preferable, beryllium, magnesium, calcium, zinc, barium, cadmium or lead is more preferable, and zinc is even more preferable. The oxidation number of the metal atom (M) is preferably +2.

Examples of the alkyl group having 1 to 24 carbon atoms represented by R in the formula (1) include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group (eicosyl group), henicosyl group (heneicosyl group), docosyl group, tricosyl group, and tetracosyl group. The alkyl group having 1 to 24 carbon atoms may have a linear structure, a branched structure or a cyclic structure, and the linear structure is preferable.

Examples of the alkenyl group having 2 to 18 carbon atoms represented by R in the formula (1) include ethenyl group (vinyl group), 1-propenyl group, 2-propenyl group, isopropenyl group, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable.

Examples of the alkynyl group having 2 to 18 carbon atoms represented by R in the formula (1) include ethynyl group, 1-propynyl group, 2-propynyl group, butynyl group, pentynyl group, hexynyl group, heptynyl group, octynyl group, nonynyl group, decynyl group, undecynyl group, dodecynyl group, tridecynyl group, tetradecynyl group, pentadecynyl group, hexadecynyl group, heptadecynyl group, and octadecynyl group. The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable.

In the formula (1), at least two of R are the alkenyl group having 2 to 18 carbon atoms or the alkynyl group having 2 to 18 carbon atoms. The complex represented by the formula (1) has two or more carbon-carbon unsaturated bonds. If the complex represented by the formula (1) has two or more carbon-carbon unsaturated bonds, the complex represented by the formula (1) can, for example, have a crosslinking reaction with a monomer having an ethylenically double bond. The number of the alkenyl group having 2 to 18 carbon atoms or alkynyl group having 2 to 18 carbon atoms in R is preferably 3 or more, more preferably 4 or more, and even more preferably 5 or more.

In the formula (1), at least two of R are preferably an alkenyl group having 2 to 18 carbon atoms and a carbon-carbon double bond at a terminal, or an alkynyl group having 2 to 18 carbon atoms and a carbon-carbon triple bond at a terminal. The number of the alkenyl group having 2 to 18 carbon atoms and a carbon-carbon double bond at a terminal or alkynyl group having 2 to 18 carbon atoms and having a carbon-carbon triple bond at a terminal in R is preferably 3 or more, more preferably 4 or more, and even more preferably 5 or more.

The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable. The position of the carbon-carbon double bond is preferably α, β-position or a terminal of the alkenyl group. As the alkenyl group having 2 to 18 carbon atoms, for example, ethenyl group (vinyl group), 1-propenyl group, 2-propenyl group, isopropenyl group, butenyl group, and pentenyl group are preferable.

The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable. The position of the carbon-carbon triple bond is preferably α, β-position or a terminal of the alkynyl group. As the alkynyl group having 2 to 18 carbon atoms, for example, ethynyl group, 1-propynyl group, 2-propynyl group, butynyl group, and pentynyl group are preferable.

In the formula (1), at least one of R is the alkyl group having 6 to 24 carbon atoms. If at least one of R is the alkyl group having 6 to 24 carbon atoms, the dispersibility of the complex in the rubber is enhanced. In light of enhancing the dispersibility of the complex in the rubber, at least one of R is preferably the alkyl group having 8 to 24 carbon atoms, more preferably the alkyl group having 16 to 20 carbon atoms.

In the formula (1), the number of the alkyl group having 6 to 24 carbon atoms in R is preferably 3 or less, more preferably 2 or less. If the number of the alkyl group having 6 to 24 carbon atoms is excessive, the crosslinking reaction efficiency with a monomer having an ethylenically double bond is lowered.

Examples of the alkyl group having 6 to 24 carbon atoms include hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group (eicosyl group), henicosyl group (heneicosyl group), docosyl group, tricosyl group, and tetracosyl group. The alkyl group having 6 to 24 carbon atoms may have a linear structure, a branched structure or a cyclic structure, and the linear structure is preferable.

The complex according to the present invention is preferably a complex in which at least four of R in the formula (1) are the alkenyl group having 2 to 18 carbon atoms or the alkynyl group having 2 to 18 carbon atoms, and the rest of R in the formula (1) is the alkyl group having 6 to 24 carbon atoms.

Examples of the complex represented by the formula (1) include a complex in which five of R are vinyl group, one of R is heptyl group, decyl group, undecyl group, heptadecyl group or henicosyl group, and the metal atom (M) is zinc; and a complex in which five of R are isopropenyl group, one of R is heptyl group, decyl group, undecyl group, heptadecyl group or henicosyl group, and the metal atom (M) is zinc.

In the complex represented by the formula (1), n may be an integer of 1 or more. In the complex represented by the formula (1), a structure with n=1 represents a basic structural unit of the complex, and a complex having a structure with an integral multiple of this basic structural unit is included in the present invention. In the present invention, n is preferably an integer of 1 to 8.

Examples of the structure of the complex represented by the formula (1) include a structure having four metal atoms (M) binding to an oxygen atom (O) and a carboxylate group (RCOO) coordinating to the metal atoms. Examples of the configuration of the four metal atoms binding to the oxygen atom include a regular tetrahedron configuration and a planar quadrangle configuration. In addition, the coordination mode of the carboxylate group to the metal atoms is bidentate coordination. It is noted that the two oxygen atoms of the carboxylate group may coordinate to the different metal atom or to the same metal atom, and preferably coordinate to the different metal atom.

In a preferable embodiment, the complex according to the present invention is a mixture containing at least one of the following complexes: a complex in which no R in the formula (1) is the alkenyl group having 2 to 18 carbon atoms or the alkynyl group having 2 to 18 carbon atoms; a complex in which one of R in the formula (1) is the alkenyl group having 2 to 18 carbon atoms or the alkynyl group having 2 to 18 carbon atoms; a complex in which two of R in the formula (1) are the alkenyl group having 2 to 18 carbon atoms or the alkynyl group having 2 to 18 carbon atoms; a complex in which three of R in the formula (1) are the alkenyl group having 2 to 18 carbon atoms or the alkynyl group having 2 to 18 carbon atoms; a complex in which four of R in the formula (1) are the alkenyl group having 2 to 18 carbon atoms or the alkynyl group having 2 to 18 carbon atoms; a complex in which five of R in the formula (1) are the alkenyl group having 2 to 18 carbon atoms or the alkynyl group having 2 to 18 carbon atoms; and a complex in which six of R in the formula (1) are the alkenyl group having 2 to 18 carbon atoms or the alkynyl group having 2 to 18 carbon atoms.

In the case that the complex according to the present invention is a mixture of the complexes, each of which has a different functional group number of the alkenyl group having 2 to 18 carbon atoms or the alkynyl group having 2 to 18 carbon atoms, in the formula (1), the average functional group number of the alkenyl group having 2 to 18 carbon atoms or the alkynyl group having 2 to 18 carbon atoms is preferably 1 or more, more preferably 2 or more, even more preferably 4 or more, and most preferably 5 or more. It is noted that the average functional group number is calculated by dividing the mole number of all the functional groups consisting of the alkenyl group having 2 to 18 carbon atoms and the alkynyl group having 2 to 18 carbon atoms in the complex represented by the formula (1) by the mole number of the molecule of the complex represented by the formula (1) and n.

In a preferable embodiment, the complex according to the present invention is a mixture of at least one of the following complexes: a complex in which no R in the formula (1) is the alkyl group having 6 to 24 carbon atoms; a complex in which one of R in the formula (1) is the alkyl group having 6 to 24 carbon atoms; a complex in which two of R in the formula (1) are the alkyl group having 6 to 24 carbon atoms; a complex in which three of R in the formula (1) are the alkyl group having 6 to 24 carbon atoms; a complex in which four of R in the formula (1) are the alkyl group having 6 to 24 carbon atoms; a complex in which five of R in the formula (1) are the alkyl group having 6 to 24 carbon atoms; and a complex in which six of R in the formula (1) are the alkyl group having 6 to 24 carbon atoms.

In the case that the complex according to the present invention is a mixture of the complexes, each of which has a different functional group number of the alkyl group having 6 to 24 carbon atoms, in the formula (1), the average functional group number of the alkyl group having 6 to 24 carbon atoms is preferably 0.2 or more, more preferably 0.4 or more, even more preferably 1 or more, and most preferably 2 or more, and is preferably 5 or less, more preferably 4 or less, and even more preferably 3 or less. It is noted that the average functional group number is calculated by dividing the mole number of all the functional groups consisting of the alkyl group having 6 to 24 carbon atoms in the complex represented by the formula (1) by the mole number of the molecule of the complex represented by the formula (1) and n.

In other words, the present invention includes a complex mixture represented by the formula (1).

[M$_4$O(RCOO)$_6$]$_n$ (1)

[In the formula (1), M is a metal atom, O is an oxygen atom, RCOO is a carboxylate group, and R is a hydrogen atom, an alkyl group having 1 to 24 carbon atoms, an alkenyl group having 2 to 18 carbon atoms or an alkynyl group having 2 to 18 carbon atoms. In the formula (1), a plurality of R may be identical to or different from each other, the average functional group number of the alkenyl group having 2 to 18 carbon atoms or the alkynyl group having 2 to 18 carbon atoms among R is 1 or more, the average functional group number of the alkyl group having 6 to 24 carbon atoms among R is 0.2 or more, and n is an integer of 1 to 8].

In the present invention, the complex represented by the formula (1) is preferably a complex represented by a structural formula (2):

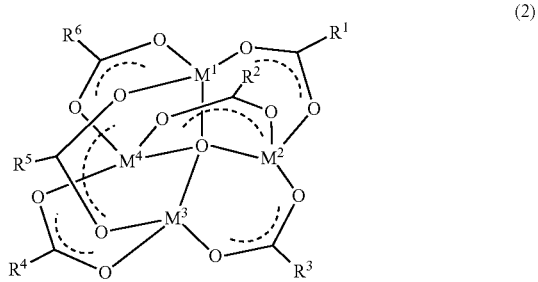

(2)

[In the structural formula (2), M$^1$ to M$^4$ are identical to or different from each other and represent a metal atom, R$^1$ to R$^6$ are identical to or different from each other and represent a hydrogen atom, an alkyl group having 1 to 24 carbon atoms, an alkenyl group having 2 to 18 carbon atoms or an alkynyl group having 2 to 18 carbon atoms, at least two of R$^1$ to R$^6$ are the alkenyl group having 2 to 18 carbon atoms or the alkynyl group having 2 to 18 carbon atoms, and at least one of R$^1$ to R$^6$ is the alkyl group having 6 to 24 carbon atoms].

In the complex represented by the structural formula (2), the oxygen atom 3) exists at a center of a regular tetrahedron configuration, and the metal atoms M$^1$ to M$^4$ locate at four corners of the regular tetrahedron configuration. Such structure is called a tetranucleus metal duster structure. One oxygen atom in three carboxylate groups each coordinates to the metal atom M$^1$ to M$^4$ constituting one nucleus. Four oxygen atoms binding to the metal atom M$^1$ to M$^4$ locate at four corners of the regular tetrahedron configuration having the metal atom M$^1$ to M$^4$ as the center.

In the structural formula (2), the dotted line shows a resonance hybrid of the carbonyl bond (—C═O) and the single bond (—C—O—) in the carboxylate group. In addition, in the structural formula (2), the covalent bond and the coordination bond are both shown in a solid line.

Examples of the metal atom represented by M$^1$ to M$^4$ in the structural formula (2) include an alkali metal such as lithium, sodium, potassium, rubidium and cesium; an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. These metal atoms may be used solely, or at least two of them may be used. Among them, as the metal atom, beryllium, magnesium, calcium, zinc, barium, cadmium, lead, copper or nickel Is preferable, beryllium, magnesium, calcium, zinc, barium, cadmium or lead is more preferable, and zinc is even more preferable. The oxidation number of the metal atoms M$^1$ to M$^4$ is preferably +2. The metal atoms M$^1$ to M$^4$ may be different from each other, but are preferably all the same metal atom.

Examples of the alkyl group having 1 to 24 carbon atoms represented by R$^1$ to R$^6$ in the structural formula (2) include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group (eicosyl group), henicosyl group (henelcosyl group), docosyl group, tricosyl group, and tetracosyl group. The alkyl group having 1 to 24 carbon atoms may have a linear structure, a branched structure or a cyclic structure, and the linear structure is preferable.

Examples of the alkenyl group having 2 to 18 carbon atoms represented by R$^1$ to R$^6$ in the structural formula (2) include ethenyl group (vinyl group), 1-propenyl group, 2-propenyl group, isopropenyl group, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable.

Examples of the alkynyl group having 2 to 18 carbon atoms represented by R$^1$ to R$^6$ in the structural formula (2) include ethynyl group, 1-propynyl group, 2-propynyl group, butynyl group, pentynyl group, hexynyl group, heptynyl group, octynyl group, nonynyl group, decynyl group, undecynyl group, dodecynyl group, tridecynyl group, tetradecynyl group, pentadecynyl group, hexadecynyl group, heptadecynyl group, and octadecynyl group. The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable.

In the structural formula (2), at least two of R$^1$ to R$^6$ are the alkenyl group having 2 to 18 carbon atoms or the alkynyl group having 2 to 18 carbon atoms. The number of the alkenyl group having 2 to 18 carbon atoms or alkynyl group having 2 to 18 carbon atoms in R$^1$ to R$^6$ is preferably 3 or more, more preferably 4 or more, and even more preferably 5 or more.

The alkenyl group having 2 to 18 carbon atoms may have a linear structure or a branched structure, and the linear structure is preferable. As the alkenyl group having 2 to 18 carbon atoms, the alkenyl group having one carbon-carbon double bond is preferable. The position of the carbon-carbon double bond is preferably α, β-position or a terminal of the alkenyl group. As the alkenyl group having 2 to 18 carbon atoms, for example, ethenyl group (vinyl group), 1-propenyl group, 2-propenyl group, isopropenyl group, butenyl group, and pentenyl group are preferable.

The alkynyl group having 2 to 18 carbon atoms may have a linear structure or a branched structure, and the linear structure is preferable. As the alkynyl group having 2 to 18 carbon atoms, the alkynyl group having one carbon-carbon triple bond is preferable. The position of the carbon-carbon triple bond is preferably α, β-position or a terminal of the alkynyl group. As the alkynyl group having 2 to 18 carbon atoms, for example, ethynyl group, 1-propynyl group, 2-propynyl group, butynyl group, and pentynyl group are preferable.

In the structural formula (2), at least two of $R^1$ to $R^6$ are preferably an alkenyl group having 2 to 18 carbon atoms and a carbon-carbon double bond at a terminal, or an alkynyl group having 2 to 18 carbon atoms and a carbon-carbon triple bond at a terminal. The number of the alkenyl group having 2 to 18 carbon atoms and a carbon-carbon double bond at a terminal or alkynyl group having 2 to 18 carbon atoms and a carbon-carbon triple bond at a terminal in $R^1$ to $R^6$ is preferably 3 or more, more preferably 4 or more, and even more preferably 5 or more.

It is preferable that in the complex represented by the structural formula (2), at least four of $R^1$ to $R^6$ are the alkenyl group having 2 to 18 carbon atoms or the alkynyl group having 2 to 18 carbon atoms, and the rest of $R^1$ to $R^6$ is the alkyl group having 6 to 24 carbon atoms.

It is preferable that in the complex represented by the structural formula (2), $M^1$ to $M^4$ are zinc, at least two of $R^1$ to $R^6$ are —CH=$CH_2$ or —C($CH_3$)=$CH_2$, and at least one of $R^1$ to $R^6$ is the alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

Examples of the complex represented by the structural formula (2) include a complex in which five of $R^1$ to $R^6$ are vinyl group, one of $R^1$ to $R^6$ is heptyl group, decyl group, undecyl group, heptadecyl group or henicosyl group, and the metal atom (M) is zinc; and a complex in which five of $R^1$ to $R^6$ are isopropenyl group, one of $R^1$ to $R^6$ is heptyl group, decyl group, undecyl group, heptadecyl group or henicosyl group, and the metal atom (M) is zinc.

In a preferable embodiment, the complex according to the present invention is a mixture containing at least one of the following complexes: a complex in which no R in the formula (2) is the alkenyl group having 2 to 18 carbon atoms or the alkynyl group having 2 to 18 carbon atoms; a complex in which one of R in the formula (2) is the alkenyl group having 2 to 18 carbon atoms or the alkynyl group having 2 to 18 carbon atoms; a complex in which two of R in the formula (2) are the alkenyl group having 2 to 18 carbon atoms or the alkynyl group having 2 to 18 carbon atoms; a complex in which three of R in the formula (2) are the alkenyl group having 2 to 18 carbon atoms or the alkynyl group having 2 to 18 carbon atoms; a complex in which four of R in the formula (2) are the alkenyl group having 2 to 18 carbon atoms or the alkynyl group having 2 to 18 carbon atoms; a complex in which five of R in the formula (2) are the alkenyl group having 2 to 18 carbon atoms or the alkynyl group having 2 to 18 carbon atoms; and a complex in which six of R in the formula (2) are the alkenyl group having 2 to 18 carbon atoms or the alkynyl group having 2 to 18 carbon atoms.

In the case that the complex according to the present invention is a mixture of the complexes, each of which has a different functional group number of the alkenyl group having 2 to 18 carbon atoms or the alkynyl group having 2 to 18 carbon atoms, in the structural formula (2), the average functional group number of the alkenyl group having 2 to 18 carbon atoms or the alkynyl group having 2 to 18 carbon atoms is preferably 1 or more, more preferably 2 or more, even more preferably 4 or more, and most preferably 5 or more. It is noted that the average functional group number is calculated by dividing the mole number of all the functional groups consisting of the alkenyl group having 2 to 18 carbon atoms and the alkynyl group having 2 to 18 carbon atoms in the complex represented by the structural formula (2) by the mole number of the molecule of the complex represented by the structural formula (2).

In a preferable embodiment, the complex according to the present invention is a mixture containing at least one of the following complexes: a complex in which no R in the formula (2) is the alkyl group having 6 to 24 carbon atoms; a complex in which one of R in the formula (2) is the alkyl group having 6 to 24 carbon atoms; a complex in which two of R in the formula (2) are the alkyl group having 6 to 24 carbon atoms; a complex in which three of R in the formula (2) are the alkyl group having 6 to 24 carbon atoms; a complex in which four of R in the formula (2) are the alkyl group having 6 to 24 carbon atoms; a complex in which five of R in the formula (2) are the alkyl group having 6 to 24 carbon atoms; and a complex in which six of R in the formula (2) are the alkyl group having 6 to 24 carbon atoms.

In the case that the complex according to the present invention is a mixture of the complexes, each of which has a different functional group number of the alkyl group having 6 to 24 carbon atoms, in the structural formula (2), the average functional group number of the alkyl group having 6 to 24 carbon atoms is preferably 0.2 or more, more preferably 0.4 or more, even more preferably 1 or more, and most preferably 2 or more, and is preferably 5 or less, more preferably 4 or less, and even more preferably 3 or less. It is noted that the average functional group number is calculated by dividing the mole number of all the functional groups consisting of the alkyl group having 6 to 24 carbon atoms in the complex represented by the structural formula (2) by the mole number of the molecule of the complex represented by the structural formula (2).

In other words, the present invention includes a complex mixture represented by the structural formula (2).

[In the structural formula (2), $M^1$ to $M^4$ are identical to or different from each other and represent a metal atom, $R^1$ to $R^6$ are identical to or different from each other and represent a hydrogen atom, an alkyl group having 1 to 24 carbon atoms, an alkenyl group having 2 to 18 carbon atoms or an alkynyl group having 2 to 18 carbon atoms, the average functional group number of the alkenyl group having 2 to 18 carbon atoms or the alkynyl group having 2 to 18 carbon atoms among $R^1$ to $R^6$ is 1 or more, and the average functional group number of the alkyl group having 6 to 24 carbon atoms among $R^1$ to $R^6$ is 0.2 or more.]

The complex represented by the formula (1) and the complex having the structural formula (2) according to the present invention are instable to water. Thus, the amount of water in the complex is preferably controlled to 250 ppm or less, more preferably 100 ppm or less, and even more preferably 50 ppm or less. In addition, when the complex is stored, the complex is preferably stored in an environment with a relative humidity of 30% or less, more preferably 20% or less, and even more preferably 10% or less.

The present invention includes a process for preparing a complex, comprising a step of reacting a compound represented by a formula (3-1), a compound represented by a formula (3-2) and a metal oxide represented by a formula (4) in a solvent:

$$[M^5(R^7COO)_x] \cdot yH_2O \qquad (3\text{-}1)$$

$$[M^6(R^8COO)_x] \cdot yH_2O \qquad (3\text{-}2)$$

$$M^7_a O_b \qquad (4)$$

[In the formula (3-1), $M^5$ is a metal atom, $R^7$ is an alkenyl group having 2 to 18 carbon atoms or an alkynyl group having 2 to 18 carbon atoms, x is a number corresponding to oxidation number of the metal atom $M^5$ and is an integer of 2 or more, y is an integer of 0 or more, and a plurality of $R^7$ may be identical to or different from each other.

In the formula (3-2), $M^6$ is a metal atom, $R^8$ is an alkyl group having 6 to 24 carbon atoms, x is a number corresponding to oxidation number of the metal atom $M^6$ and is an integer of 2 or more, y is an integer of 0 or more, and a plurality of $R^8$ may be identical to or different from each other.

In the formula (4), $M^7$ is a metal atom, a is an integer of 1 to 5, and b is an integer of 1 to 7].

It is noted that in the description of the present invention, occasionally, the compound represented by the formula (3-1) is simply referred to as "compound (3-1)", the compound represented by the formula (3-2) is simply referred to as "compound (3-2)", the compound represented by the formula (3-1) and the compound represented by the formula (3-2) are collectively referred to as "compound (3)", and the metal oxide represented by the formula (4) is simply referred to as "metal oxide (4)".

The materials used in the process for preparing the complex according to the present invention will be explained. $R^7$ in the compound (3-1) is the alkenyl group having 2 to 18 carbon atoms or the alkynyl group having 2 to 18 carbon atoms.

Examples of the alkenyl group having 2 to 18 carbon atoms include ethenyl group (vinyl group), 1-propenyl group, 2-propenyl group, isopropenyl group, butenyl group, pentenyl group, hexenyl group, heptenyl group, octenyl group, nonenyl group, decenyl group, undecenyl group, dodecenyl group, tridecenyl group, tetradecenyl group, pentadecenyl group, hexadecenyl group, heptadecenyl group, and octadecenyl group. The alkenyl group having 2 to 18 carbon atoms may have a linear structure or a branched structure, and the linear structure is preferable. As the alkenyl group having 2 to 18 carbon atoms, an alkenyl group having one carbon-carbon double bond is preferable. The position of the carbon-carbon double bond is preferably α, β-position or a terminal of the alkenyl group. Preferable examples of the alkenyl group having 2 to 18 carbon atoms include ethenyl group (vinyl group), 1-propenyl group, 2-propenyl group, isopropenyl group, butenyl group, and pentenyl group.

Examples of the alkynyl group having 2 to 18 carbon atoms include ethynyl group, 1-propynyl group, 2-propynyl group, butynyl group, pentynyl group, hexynyl group, heptynyl group, octynyl group, nonynyl group, decynyl group, undecynyl group, dodecynyl group, tridecynyl group, tetradecynyl group, pentadecynyl group, hexadecynyl group, heptadecynyl group, and octadecynyl group. The alkynyl group having 2 to 18 carbon atoms may have a linear structure or a branched structure, and the linear structure is preferable. As the alkynyl group having 2 to 18 carbon atoms, an alkynyl group having one carbon-carbon triple bond is preferable. The positon of the carbon-carbon triple bond is preferably α, β-position or a terminal of the alkynyl group. Preferable examples of the alkynyl group having 2 to 18 carbon atoms include ethynyl group, 1-propynyl group, 2-propynyl group, butynyl group, and pentynyl group.

Examples of the metal atom ($M^5$) in the formula (3-1) include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom, the metal atom capable of forming a divalent metal ion is preferable, beryllium, magnesium, calcium, zinc, barium, cadmium or lead is more preferable. These metal atoms may be used solely, or a mixture of at least two of them may be used.

x represents a number of the carboxylate groups (RCOO) in the compound (3-1). x is a number corresponding to oxidation number of the metal atom $M^5$, and is an integer of 2 or more. x is, for example, preferably 2 to 5, more preferably 2. y is an integer of 0 or more, and is, for example, preferably 0 to 5, more preferably 0. This is because if y is 1 or more, the yield of the target complex tends to be lowered.

$R^8$ in the compound (3-2) is the alkyl group having 6 to 24 carbon atoms.

Examples of the alkyl group having 6 to 24 carbon atoms include hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, icosyl group (eicosyl group), henicosyl group (heneicosyl group), docosyl group, tricosyl group, and tetracosyl group. The alkyl group having 6 to 24 carbon atoms may have a linear structure, a branched structure or a cyclic structure, and the linear structure is preferable.

Examples of the metal atom ($M^6$) in the formula (3-2) include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom, the metal atom capable of forming a divalent metal ion is preferable, beryllium, magnesium, calcium, zinc, barium, cadmium or lead is more preferable. These metal atoms may be used solely, or a mixture of at least two of them may be used.

x represents a number of the carboxylate groups (RCOO) in the compound (3-2). x is a number corresponding to oxidation number of the metal atom $M^6$, and is an integer of 2 or more. x is, for example, preferably 2 to 5, more preferably 2. y is an integer of 0 or more, and is, for example, preferably 0 to 5, more preferably 0. This is because if y is 1 or more, the yield of the target complex tends to be lowered.

Preferable specific examples of the compound (3-1) and the compound (3-2) include a fatty acid metal salt with y=0 in the formula (3-1) and the formula (3-2). Examples of the fatty acid constituting the fatty acid metal salt include a saturated fatty acid and an unsaturated fatty acid.

The fatty acid constituting the compound (3-1) is preferably an unsaturated fatty acid having 3 to 6 carbon atoms. Examples of the unsaturated fatty acid include an unsaturated fatty acid having a carbon-carbon double bond, such as propenoic acid (acrylic acid), 2-methylprop-2-enoic acid (methacrylic acid), 2-butenoic acid, 3-butenoic acid, 4-pentenoic acid, and 5-hexenoic acid; and an unsaturated fatty acid having a carbon-carbon triple bond, such as propiolic acid, 3-butynoic acid, 4-pentynoic acid, 5-hexynoic acid, and 6-heptynoic acid.

The fatty acid constituting the fatty acid metal salt of the compound (3-2) is preferably a saturated fatty acid having 7 to 25 carbon atoms. Examples of the saturated fatty acid having 7 to 25 carbon atoms include heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid (eicosanoic acid), henicosanoic acid (heneicosanoic acid), docosanoic acid, tricosanoic acid, tetracosanoic acid, and pentacosanoic acid.

Examples of the metal atom ($M^5$, $M^6$) of the fatty acid metal salt include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. Among them, as the metal atom, the metal atom capable of forming a divalent metal ion is preferable, beryllium, magnesium, calcium, zinc, barium, cadmium or lead is more preferable.

These metal atoms may be used solely, or a mixture of at least two of them may be used.

The fatty acid metal salt is preferably the fatty acid metal salt in which the metal ion is a divalent metal ion.

The compound (3-1) is preferably the acrylic acid metal salt or methacrylic acid metal salt in which the metal ion is a divalent metal ion, more preferably zinc acrylate or zinc methacrylate.

The compound (3-2) is preferably zinc octanoate, zinc laurate, zinc stearate, or zinc behenate.

In the preparing process according to the present invention, the metal oxide represented by the formula (4) is used.

(4)

Examples of the metal atom ($M^7$) include an alkali metal such as lithium, sodium, potassium, rubidium and cesium; an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; a base metal such as beryllium, magnesium, aluminum, zinc, gallium, cadmium, indium, tin, thallium, lead, bismuth and polonium. Among them, as the metal atom $M^7$, the metal atom capable of forming a divalent metal ion is preferable, and beryllium, magnesium, calcium, zinc, barium, cadmium or lead is more preferable. These metal atoms may be used solely, or a mixture of at least two of them may be used.

In the preparing process according to the present invention, the metal atom $M^5$ in the compound (3-1), the metal atom $M^8$ in the compound (3-2) and the metal atom $M^7$ in the metal oxide (4) may be identical to or different from each other, and are preferably identical to each other.

In the metal oxide (4), a is preferably an integer of 1 or more and 5 or less, more preferably an integer of 1 or more and 3 or less, and most preferably 1, and b is preferably an integer of 1 or more and 7 or less, more preferably an integer of 1 or more and 5 or less, even more preferably an integer of 1 or more and 3 or less, and most preferably 1. As the metal oxide (4), a divalent metal oxide with a=1 and b=1 is preferable.

Specific examples of the metal oxide (4) include an alkali metal oxide such as lithium oxide, sodium oxide, potassium oxide, rubidium oxide and cesium oxide; an alkaline earth metal oxide such as calcium oxide, strontium oxide and barium oxide; a transition metal oxide such as scandium oxide, titanium oxide, vanadium oxide, chromium oxide, manganese oxide, iron oxide, cobalt oxide, nickel oxide, copper oxide, yttrium oxide, zirconium oxide, niobium oxide, molybdenum oxide, technetium oxide, ruthenium oxide, rhodium oxide, palladium oxide, silver oxide, hafnium oxide, tantalum oxide, tungsten oxide, rhenium oxide, osmium oxide, iridium oxide, platinum oxide and gold oxide; and a base metal oxide such as beryllium oxide, magnesium oxide, aluminum oxide, zinc oxide, gallium oxide, cadmium oxide, indium oxide, tin oxide, thallium oxide, lead oxide, bismuth oxide and polonium oxide. These metal oxides may be used solely, or a mixture of at least two of them may be used. Among them, as the metal oxide, the divalent metal oxide is preferable, and beryllium oxide, magnesium oxide, calcium oxide, zinc oxide, barium oxide, cadmium oxide or lead oxide is more preferable. In the present invention, as the metal oxide (4), zinc oxide is most preferably used.

Examples of the solvent used to conduct the reaction in the preparing process according to the present invention include, but are not limited to, a halogen solvent such as tetrachloromethane, dichloromethane, 1,1-dichloroethane, 1,2-dichloroethane, 1,1,2,2-tetrachloroethane, chloroform, dibromomethane, tetrachloroethylene, trichloroethylene, chlorobenzene, dichlorobenzene; and benzene, toluene, xylene, tetrahydrofuran, 1,4-dioxane, ethyl acetate, propyl acetate, isopropyl acetate, and acetonitrile. From the viewpoint of enhancing the yield of the complex, the solvent is preferably the halogen solvent, more preferably chloroform.

Hereinafter, in the process for preparing the complex according to the present invention, the compound (3-1) and the compound (3-2) are collectively explained as "the compound (3)", unless otherwise specified.

Specific examples of the process for preparing a complex comprising a step of conducting the reaction between the compound (3) and the metal oxide (4) include a preparing process comprising: a step of dissolving or dispersing the compound (3) and the metal oxide (4) in a first solvent and stirring the resultant reaction liquid (reaction step); a step of removing an insoluble substance from the reaction liquid (insoluble substance removal step); and a step of removing the solvent from the reaction liquid (drying step).

(Reaction Step)

In the reaction step, the compound (3) and the metal oxide (4) are dissolved or dispersed in a first solvent, and the resultant reaction liquid is stirred. In this step, the compound (3) and the metal oxide (4) are allowed to contact each other in the solvent to produce the complex.

Specifically, firstly, the metal oxide (4) is dissolved or dispersed in a solvent in a reaction vessel. While stirring the liquid having the metal oxide (4) dissolved or dispersed in the solvent, a liquid having the compound (3) dissolved or dispersed in a solvent is added therein. The liquid having the compound (3) dissolved or dispersed in the solvent may be added dropwise therein. In this case, the dropwise addition time is preferably, but not limited to, 0.5 hour to 3 hours. The reaction is preferably conducted while further stirring the reaction liquid after the dropwise addition.

The reaction is preferably conducted in an inert gas atmosphere such as nitrogen and argon. In particular, the reaction system is preferably a closed system or a system under an inert gas flow since the produced complex is instable to water.

In the reaction between the compound (3) and the metal oxide (4), the molar ratio ((3)/(4)) of the compound (3) to the metal oxide (4) is preferably 3/2 or more, more preferably 2/1 or more, and is preferably 5/1 or less, more preferably 4/1 or less. This is because if the molar ratio ((3)/(4)) of the compound (3) to the metal oxide (4) falls within the above range, the yield of the obtained complex is higher.

The molar ratio ((3-1)/(3-2)) of the compound (3-1) to the compound (3-2) is preferably 1/20 or more, more preferably 1/10 or more, and is preferably 100/1 or less, more preferably 20/1 or less. If the molar ratio falls within the above range, the obtained complex has a better yield, the effect of introducing the compound (3-2) as the ligand of the complex is obtained, and thus it is possible to synthesize the complex in a good yield.

In addition, the amount of the solvent in the reaction is preferably 1000 parts by mass or more, more preferably 2000 parts by mass or more, and even more preferably 3000 parts by mass or more, and is preferably 10000 parts by mass or less, more preferably 8000 parts by mass or less, and even more preferably 6000 parts by mass or less, with respect to 100 parts by mass of a total amount of the compound (3) and the metal oxide (4). If the amount of the solvent is 1000 parts by mass or more, the yield of the complex is higher, and if the amount of the solvent is 10000 parts by mass or less, the synthetic workload can be lowered.

The reaction temperature (temperature of the reaction liquid) is preferably −20° C. or more, more preferably 0° C. or more, even more preferably 10° C. or more, and most preferably 20° C. or more, and is preferably 100° C. or less, more preferably 90° C. or less, even more preferably 80° C. or less, and most preferably 50° C. or less. If the reaction temperature is −20° C. or more, the reaction speed between the compound (3) and the metal oxide (4) can be enhanced. In addition, if the reaction temperature is 100° C. or less, the self-polymerization of the compound (3) can be prevented.

The reaction time is preferably 1 hour or more, more preferably 3 hours or more, and even more preferably 12 hours or more. This is because if the reaction time is too short, the yield of the complex may be lowered. In addition, from the viewpoint of enhancing the productivity, the reaction time is preferably 300 hours or less, more preferably 200 hours or less, and even more preferably 100 hours or less. It is noted that the end of the reaction can be confirmed, for example, by a method of measuring the infrared absorption of a sample taken from the reaction liquid, or by a method of measuring the change in the weight or the like of the component dissolved in the reaction liquid.

(Insoluble Substance Removal Step)

After the reaction, the insoluble substance is removed from the reaction liquid. Examples of the insoluble substance include unreacted raw materials, and the self-polymerized polymer of the compound (3). Examples of the method of removing the insoluble substance include, but are not limited to, a method of filtering the reaction liquid.

(Drying Step)

In the drying step, the solvent is removed from the reaction liquid from which the insoluble substance has been removed. A mixture containing the compound (3) and the produced complex is obtained by removing the solvent.

Examples of the method of removing the solvent include a method of drying under reduced pressure and a method of drying under heating, and the drying under reduced pressure is preferable. When performing the drying under reduced pressure, the reaction liquid may be heated. The temperature of the reaction liquid when performing the drying is preferably 100° C. or less, more preferably 80° C. or less, and even more preferably 60° C. or less.

The preparing process according to the present invention may further comprise a step of purifying the obtained complex. It is noted that when the step of purifying the complex is comprised, the above-mentioned insoluble substance removal step and/or drying step may be omitted. Examples of the purification method include a method of removing the compound (3) from the reaction liquid in the preparing process (a method including a purification step); and a method of performing reprecipitation of the mixture of the complex and the compound (3) obtained in the preparing process (a method including a reprecipitation step). Among them, the method of removing the compound (3) from the reaction liquid in the preparing process is preferable.

(Purification Step)

In the purification step, a second solvent is charged into the reaction liquid from which the insoluble substance has been removed in the preparing process, and the resultant precipitate is removed. Raw materials, by-products and the like dissolved in the first solvent are precipitated by charging the second solvent into the reaction liquid. The purity of the finally obtained complex can be enhanced by removing the precipitate.

The second solvent is not particularly limited, as long as it can selectively precipitate the compound (3) in the reaction liquid. In other words, the solubility of the target complex in the second solvent is higher than the solubility of the compound (3) in the second solvent. Examples of the second solvent include hydrocarbons such as hexane, pentane, cyclohexane and heptane.

The amount of the second solvent may be appropriately adjusted such that the compound (3) can be precipitated. The amount of the second solvent is preferably 10 parts by mass or more, more preferably 20 parts by mass or more, and even more preferably 30 parts by mass or more, and is preferably 200 parts by mass or less, more preferably 150 parts by mass or less, and even more preferably 100 parts by mass or less, with respect to 100 parts by mass of the amount of the first solvent.

In addition, after the second solvent is charged, a part of the first solvent and second solvent may be removed to precipitate the compound (3). As the method of removing a part of the first solvent and second solvent, concentration under reduced pressure is preferable. When performing the concentration under reduced pressure, the reaction liquid may be heated. The temperature of concentrating the reaction liquid is preferably 100° C. or less, more preferably 80° C. or less, and even more preferably 60° C. or less.

Examples of the method of removing the precipitated compound (3) include a method of filtering the reaction liquid. The target complex is obtained by removing the first solvent and the second solvent in the drying step from the reaction liquid from which the precipitate has been removed. It is noted that the purification step may be performed several times depending on the desired purity of the complex.

(Reprecipitation Step)

In the reprecipitation step, the reprecipitation of the mixture of the complex and the compound (3) obtained in the preparing process is performed. Specifically, the mixture of the complex and the compound (3) obtained in the preparing process is dissolved in the first solvent, the second solvent is charged into the resultant solution to precipitate the compound (3), and the precipitate is removed.

As the first solvent and the second solvent used in the reprecipitation step, those listed in the reaction step and the purification step may be used. In addition, the preferable amount of the second solvent and the preferable method of removing the precipitate are identical to those in the purification step. The target complex is obtained by removing the solvent after the precipitate is removed. The preferable method of removing the solvent is identical to that in the drying step. It is noted that the reprecipitation step may be performed several times depending on the desired purity of the target complex.

The preparing process according to the present invention is suitable for a method of preparing the complex represented by the general formula (1) and the complex represented by the structural formula (2). Details of the complex represented by the general formula (1) are described above, and its gist is as follows.

$[M_4O(RCOO)_6]_n$ (1)

[In the formula (1), M is a metal atom, and R is a hydrogen atom, an alkyl group having 1 to 24 carbon atoms, an alkenyl group having 2 to 18 carbon atoms or an alkynyl group having 2 to 18 carbon atoms. In the formula (1), a plurality of R may be identical to or different from each other, at least two of R are the alkenyl group having 2 to 18 carbon atoms or the alkynyl group having 2 to 18 carbon atoms, at least one of R is the alkyl group having 6 to 24 carbon atoms, and n is an integer of 1 to 8.]

Details of the complex represented by the structural formula (2) are described above, and its gist is as follows.

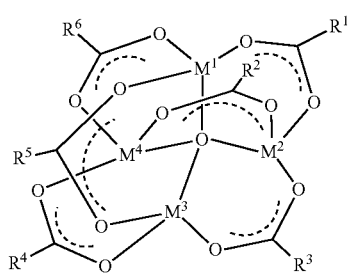

(2)

[In the structural formula (2), $M^1$ to $M^4$ are identical to or different from each other and represent a metal atom, $R^1$ to $R^6$ are identical to or different from each other and represent a hydrogen atom, an alkyl group having 1 to 24 carbon atoms, an alkenyl group having 2 to 18 carbon atoms or an alkynyl group having 2 to 18 carbon atoms, at least two of $R^1$ to $R^6$ are the alkenyl group having 2 to 18 carbon atoms or the alkynyl group having 2 to 18 carbon atoms, and at least one of $R^1$ to $R^6$ is the alkyl group having 6 to 24 carbon atoms.]

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Direct Introduction-Mass Analysis (DI-MS)

The mass analysis was carried out with a mass analyzer (SynaptG2-S type available from Waters Corporation).

Ionization method: atmospheric solids analysis probe (ASAP)

Measuring mode: Pos., Neg.

Measuring range: m/z=50 to 1500

(2) CHN Element Analysis

The element analysis was carried out with an organic trace element analyzer (Micro Corder JM10 type available from J-Science Lab Co., Ltd.).

(3) Zinc Amount Measurement

The produced complex (0.1171 g) was weighed and put into a beaker with a volume of 100 ml, and 50 ml of distilled water was added to dissolve the complex. Into the resultant liquid, 10 ml of acetic acid-sodium acetate (pH 5) buffer was added, and some drops of a XO indicator (0.1 w/v % of xylenol orange solution for titration available from Wako Pure Chemical Industries, Ltd.: 0.1 g/100 ml=0.001396 M) were added. Finally, distilled water was added to adjust the liquid volume to 100 ml. The obtained liquid was titrated with 0.05 moVl of an EDTA standard titrant (available from Dojin Chemical, Inc.).

(4) Infrared Spectroscopic Analysis

The infrared spectroscopic analysis was carried out with a Fourier transform infrared spectrophotometer ("measuring instrument: Spectrum One" available from PerkinElmer. Inc.) by a total reflection absorption measuring method (ATR method) using diamond as a prism of the total reflection absorption measurement.

(5) Powder X-Ray Diffraction

The X-ray diffraction measurement was carried out with a wide angle X-ray diffraction instrument ("RINT-TTR III type" available from Rigaku Corporation). The measuring sample was pulverized with an agate mortar. The measuring conditions were as follows.

X-ray source: CuKα X-ray

Tube voltage-tube current: 50 kV-300 mA

Step width: 0.02 deg.

Measuring speed: 5 deg./min

Slit system: light diffusion-light reception-light scattering: 0.5 deg.-opening-0.5 deg.

Monochromator: diffraction curve bent-crystal monochromator (6) Rebound Resilience (%)

The rebound resilience test was conducted according to JIS K6255 (2013). Sheets with a thickness of about 2 mm were produced by heat press molding the rubber composition at 170° C. for 20 minutes or at 230° C. for 5 minutes. A cylindrical test piece with a thickness of about 12 mm and a diameter of 28 mm was produced by punching the sheet obtained above into a circular shape with a diameter of 28 mm, and stacking six of the obtained circular sheets. The test piece was stored at a temperature of 23° C. plus or minus 2°

C. and a relative humidity of 50% plus or minus 5% for 12 hours. The rebound resilience of the obtained test piece was measured with a Lupke type rebound resilience tester (available from Ueshima Seisakusho Co., Ltd.). The planar part of the stacked test piece obtained above was held by a mechanical fixing method, and the measurement was conducted at a temperature of 23° C., relative humidity of 50%, impact end diameter of 12.50 mm plus or minus 0.05 mm, impact mass of 0.35 kg plus or minus 0.01 kg and impact speed of 1.4 m/s plus or minus 0.01 m/s.

Preparing Example 2 for Preparing Zinc Acrylate Oxo Cluster

The reaction was conducted by the same method as the preparing example 1 for preparing zinc acrylate oxo cluster except that the reaction time was for 48 hours, to obtain a product 2 (615 g, yield 57%).

The preparing conditions and results of the preparing examples 1, 2 for preparing zinc acrylate oxo cluster are summarized in Table 1.

TABLE 1

| Preparing example | Compound (3) (g) | (mmol) | Metal oxide (4) (g) | (mmol) | Compound (3)/Metal oxide (4) (molar ratio) | Solvent (mL) | Temperature (° C.) | Time (h) | Output (g) | Yield (%) |
|---|---|---|---|---|---|---|---|---|---|---|
| 1 | ZDA 955 | 4600 | ZnO 125 | 1540 | 3:1 | dichloromethane 18700 | 40° C. | 3 | 87.4 | 8 |
| 2 | ZDA 955 | 4600 | ZnO 125 | 1540 | 3:1 | dichloromethane 18700 | 40° C. | 48 | 615 | 57 |

ZDA: zinc acrylate
Yield (%) = 100 × (value obtained by dividing each output by molecular weight of cluster)/(theoretical value (mole) of cluster estimated from raw materials)

(7) Slab Hardness (Shore C Hardness)

Sheets with a thickness of about 2 mm were produced by heat pressing the rubber composition at 170° C. for 20 minutes or at 230° C. for 5 minutes. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore C".

(8) SEM Observation

SEM observation was conducted by using a Tabletop microscope ("Miniscope TM3030Plus" available from Hitachi High-Technologies Corporation) to take photographs of the cross-section of the slab. It is noted that the slab was cut with a razor blade to allow the cross-section thereof to be exposed.

Preparing Example

Firstly, synthesis examples of zinc acrylate oxo cluster (a complex represented by the structural formula (2) in which all of $R^1$ to $R^6$ are vinyl group and the metal atoms ($M^1$ to $M^4$) are zinc) will be explained.

Preparing Example 1 for Preparing Zinc Acrylate Oxo Cluster

In an atmosphere of argon, zinc oxide (125 g, 1540 mmol), zinc acrylate (955 g, 4600 mmol) and 18.7 L of dichloromethane were charged into a reaction vessel. The mixture was stirred at 40° C. for 3 hours. It is noted that the solvent was refluxed. The obtained reaction liquid was filtered to remove the insoluble precipitate in the solvent. 14.3 L of hexane was added into the filtrate, and concentration under reduced pressure was performed until the liquid amount was reduced to about one-fourth, to obtain a precipitate. The precipitate was removed by filtration, and the filtrate was concentrated and dried to obtain a product 1 (87.4 g, yield 8%).

The mass analysis, element analysis, zinc amount measurement, X-ray diffraction measurement and infrared spectroscopic analysis were conducted for the obtained product 2. The experimental results are each shown below.

High-resolution ASAP-MS (positive) spectrum measurement results

Positive ion HR-ASAP-MS m/z: 632.7715

$[M-CH_2CHCOO]^+$ (calcd. For $C_{15}H_{15}O_{11}Zn_4$ 632.7707 Δ1.2 ppm.

High-resolution ASAP-MS (negative) spectrum measurement results

Negative ion HR-ASAP-MS m/z: 735.7762

$[M+O_2]^-$ (calcd. For $C_{18}H_{18}O_{15}Zn_4$ 735.7740 Δ2.9 ppm.

Anal. Calcd for $C_{18}H_{18}O_{13}Zn_4$: C, 30.71; H, 2.58. Found: C, 30.72; H, 2.50.

Figure 2:
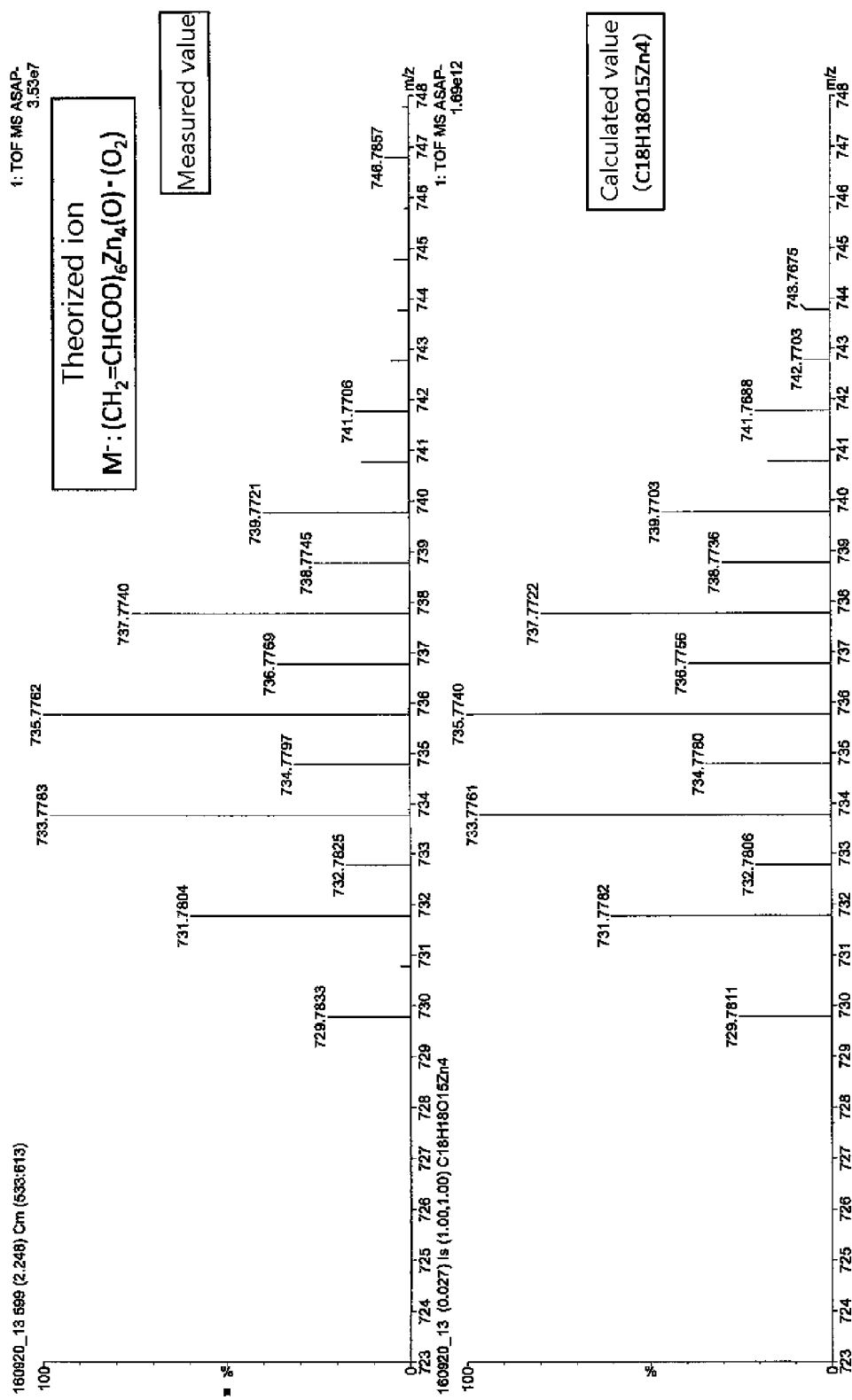
FIG. 2 shows ASAP-MS spectrum of zinc acrylate oxo cluster.

IR spectrum peak: 520 $cm^{-1}$, 600 $cm^{-1}$, 675 $cm^{-1}$, 828 $cm^{-1}$, 968 $cm^{-1}$, 1067 $cm^{-1}$, 1276 $cm^{-1}$, 1370 $cm^{-1}$, 1436 $cm^{-1}$, 1572 $cm^{-1}$, 1643 $cm^{-1}$ ASAP-MS spectra of the product 2 are shown in FIGS. 1, 2. In addition, ASAP-MS spectrum simulation patterns of anion $[Zn_4O(OCOCHCH_3)_6O_2]^{(-)}$ and cation $[Zn_4O(OCOCHCH_3)_5]^{(+)}$ theorized from $Zn_4O(OCOCHCH_2)_6$ are shown in FIGS. 1, 2. As shown in FIGS. 1, 2, the ASAP-MS spectrum has the same pattern as the simulation pattern. Further, the obtained experimental values 632.7715 and 735.7762 are very close to the estimated values which is 632.7707 for the cation $[Zn_4O(OCOCHCH_3)_5]^{(+)}$: $C_{15}H_{15}O_{11}Zn_4$ and 735.7740 for the anion $[Zn_4O(OCOCHCH_3)_6O_2]^{(-)}$: $C_{18}H_{18}O_{15}Zn_4$. In addition, the measured value of the zinc amount is 36.8 mass %, which is very close to the theoretical value 37.2 mass %. Based on these results, it can be confirmed that the above prepared product 2 is the compound represented by $Zn_4O(OCOCHCH_2)$.

The element analysis results show that the product 2 contains carbon in an amount of 30.72 mass % and hydrogen in an amount of 2.50 mass %. The differences between the analysis results and the estimated values were 0.01 mass % for the carbon amount and 0.08 mass % for the hydrogen amount. Since the atomic compositions are very close to the estimated values, it can be confirmed that the product ($Zn_4O(OCOCHCH_2)_6$) has a very high purity.

Figure 3:
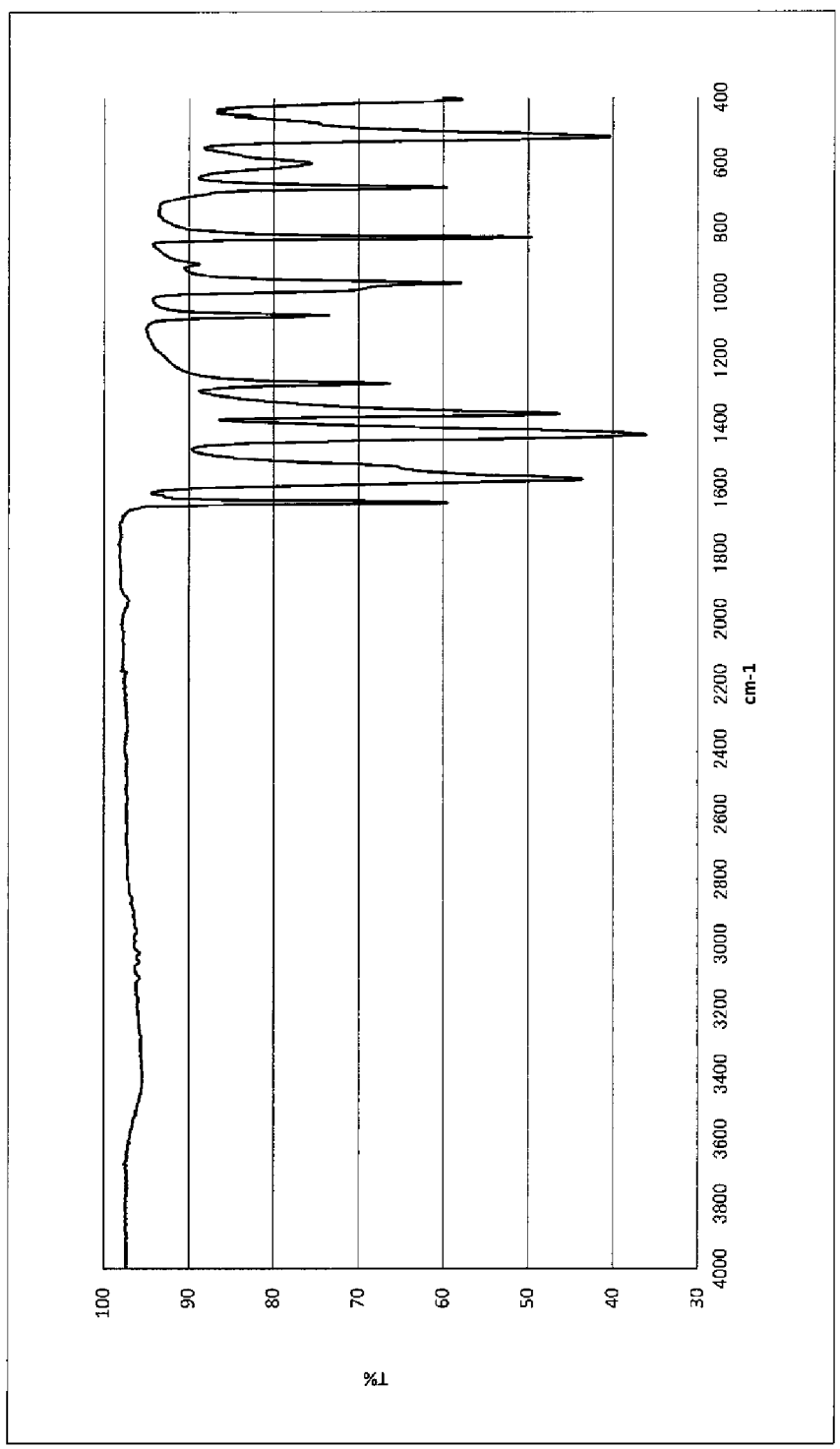
FIG. 3 shows IR spectrum of zinc acrylate oxo cluster.
Figure 4:
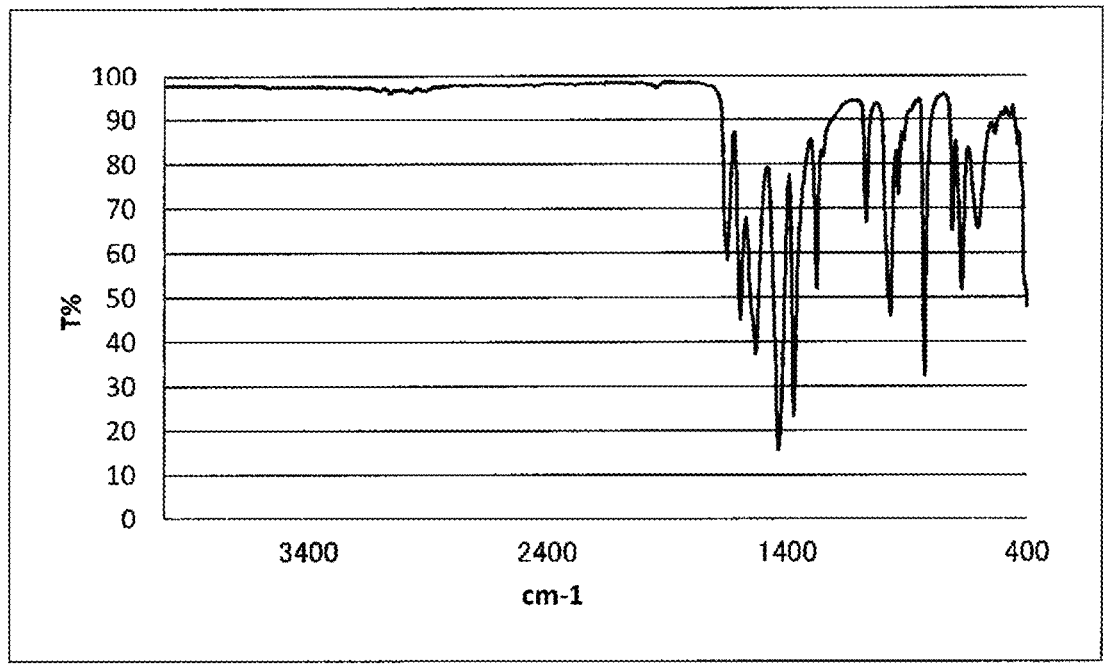
FIG. 4 shows IR spectrum of zinc acrylate.
Figure 5:
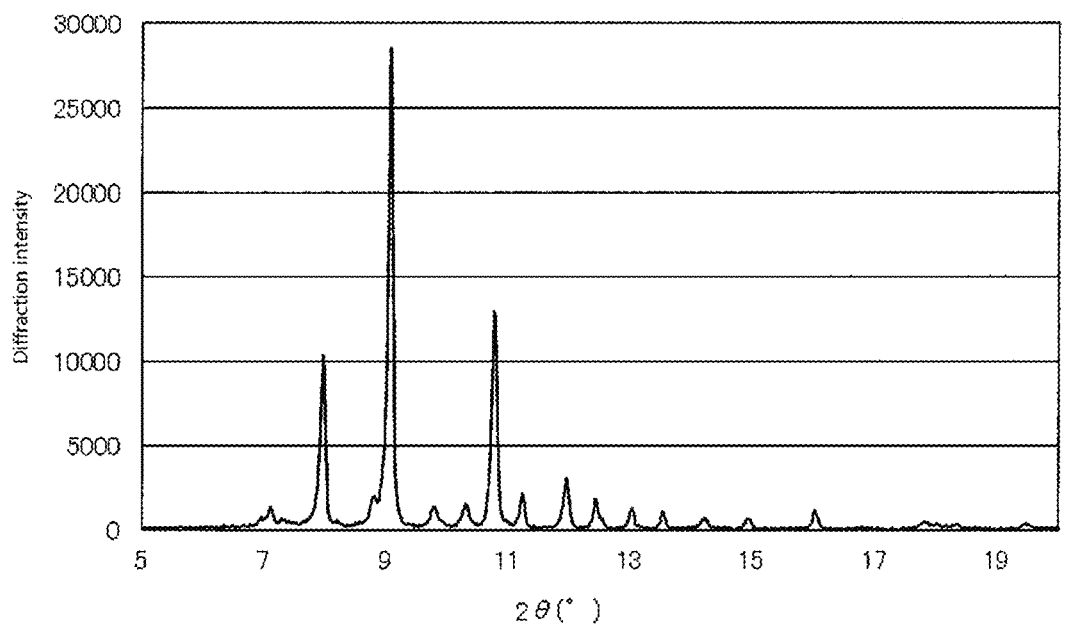
FIG. 5 shows X-ray diffraction spectrum of zinc acrylate oxo cluster.
Figure 6:
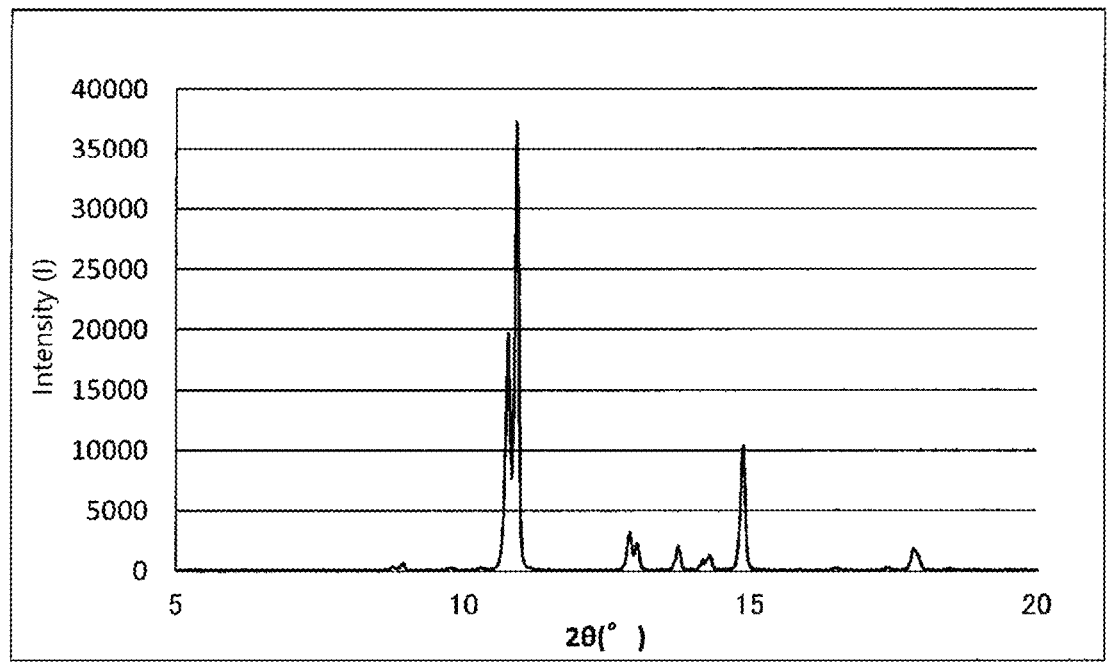
FIG. 6 shows X-ray diffraction spectrum of zinc acrylate.

FIG. 3 shows IR spectrum of the product 2 (zinc acrylate oxo cluster), and FIG. 4 shows IR spectrum of zinc diacrylate. FIG. 5 shows X-ray diffraction spectrum of the product 2 (zinc acrylate oxo cluster), and FIG. 6 shows X-ray diffraction spectrum of zinc diacrylate. Based on the IR spectra, the absorption attributed to the vinyl group of acrylate and the absorption attributed to the vibration of $Zn_4O$ are confirmed. Further, it is also confirmed that the carboxylate group has a different coordination state from zinc diacrylate. Based on the X-ray diffraction spectra, it is confirmed that the product 2 (zinc acrylate oxo cluster) has a different crystal structure from zinc diacrylate.

Comparative Preparing Example 1 for Preparing Zinc Acrylate Oxo Cluster

Zinc acrylate (2.0 g, 9.6 mmol) and 140 ml of toluene as a solvent were charged into a reaction vessel to dissolve or disperse zinc acrylate in toluene. Into the reaction liquid, 3 ml of water and 20 mg of 4-methoxyphenol as a polymerization inhibitor were further added as additives. The reaction liquid was stirred for 12 hours while refluxing toluene at 110° C. After finishing the reaction, the reaction liquid was filtered to obtain a filtrate. The filtration residue had a mass of 1.77 g (88.5%). The obtained filtrate was concentrated to obtain a concentrate (0.21 g, 10.5%). The concentrate was analyzed and no target product was confirmed.

Comparative Preparing Example 2 for Preparing Zinc Acrylate Oxo Cluster

The reaction was conducted by the same method as the comparative preparing example 1 except that chloroform was used as the solvent and the reaction liquid was stirred while refluxing chloroform at 60° C. The filtration residue had a mass of 0.24 g (12%). The obtained filtrate was concentrated to obtain a concentrate (1.44 g, 72%). The concentrate was analyzed and no target product was confirmed.

Comparative Preparing Example 3 for Preparing Zinc Acrylate Oxo Cluster

The reaction was conducted by the same method as the comparative preparing example 1 except that 140 ml of 1,2-dichlorobenzene was used as the solvent and the reaction liquid was stirred at 110° C. There was no insoluble substance in the reaction liquid. The obtained filtrate failed to be concentrated, and the target product failed to be obtained.

Comparative Preparing Example 4 for Preparing Zinc Acrylate Oxo Cluster

The reaction was conducted by the same method as the comparative preparing example 1 except that 140 ml of propyl acetate was used as the solvent and the reaction liquid was stirred while refluxing propyl acetate at 100° C. The filtration residue had a mass of 1.71 g (85.5%). The target product failed to be obtained.

Comparative Preparing Example 5 for Preparing Zinc Acrylate Oxo Cluster

The reaction was conducted by the same method as the comparative preparing example 1 except that 140 ml of acetone was used as the solvent and the reaction liquid was stirred while refluxing acetone at 56° C. The filtration residue had a mass of 0.26 g (13%). The obtained filtrate was concentrated to obtain a concentrate (1.54 g, 77%). The concentrate was analyzed and no target product was confirmed.

Comparative Preparing Example 6 for Preparing Zinc Acrylate Oxo Cluster

The reaction was conducted by the same method as the comparative preparing example 1 except that 140 ml of N,N-dimethyl formamide (DMF) was used as the solvent and the reaction liquid was stirred at 100° C. There was no insoluble substance in the reaction liquid. The obtained filtrate failed to be concentrated, and the target product failed to be obtained.

Comparative Preparing Example 7 for Preparing Zinc Acrylate Oxo Cluster

The reaction was conducted by the same method as the comparative preparing example 1 except that 140 ml of acetonitrile was used as the solvent and the reaction liquid was stirred while refluxing acetonitrile at 82° C. There was no insoluble substance in the reaction liquid. The obtained filtrate was concentrated to obtain a concentrate (1.8 g, 90%). The concentrate was analyzed and no target product was confirmed.

Comparative Preparing Example 8 for Preparing Zinc Acrylate Oxo Cluster

The reaction was carried out by the same method as the comparative preparing example 1 except that 140 ml of dimethylsulfoxide (DMSO) was used as the solvent and the reaction liquid was stirred at 100° C. There was no insoluble substance in the reaction liquid. The obtained filtrate failed to be concentrated, and the target product failed to be obtained.

The preparing conditions and results of the comparative preparing examples 1 to 8 for preparing zinc acrylate oxo cluster are summarized in Table 2.

TABLE 2

| Comparative preparing example | Raw material | | Additive | | Reaction solvent | | Reaction conditions | | Reaction product Filtration residue | |
|---|---|---|---|---|---|---|---|---|---|---|
| | | | Water | 4-Methoxyphenol | Type | ml | Temperature (° C.) | Time (h) | (g) | (%) |
| | g | mmol | | | | | | | | |
| 1 | ZDA 2.0 | 9.6 | 3 ml | 20 mg | Toluene | 140 | Reflux 110° C. | 12 | 1.77 | 88.5 |
| 2 | ZDA 2.0 | 9.6 | 3 ml | 20 mg | Chloroform | 140 | Reflux 60° C. | 12 | 0.24 | 12 |

TABLE 2-continued

| | | | | | | | | | |
|---|---|---|---|---|---|---|---|---|---|
| 3 | ZDA 2.0 9.6 | 3 ml | 20 mg | 1,2-Dichlorobenzene | 140 | 110° C. | 12 | No insoluble component | |
| 4 | ZDA 2.0 9.6 | 3 ml | 20 mg | Propyl acetate | 140 | Reflux 100° C. | 12 | 1.71 | 85.5 |
| 5 | ZDA 2.0 9.6 | 3 ml | 20 mg | Acetone | 140 | Reflux 56° C. | 12 | 0.26 | 13.0 |
| 6 | ZDA 2.0 9.6 | 3 ml | 20 mg | DMF | 140 | 100° C. | 12 | No insoluble component | |
| 7 | ZDA 2.0 9.6 | 3 ml | 20 mg | Acetonitrile | 140 | Reflux 82° C. | 12 | No insoluble component | |
| 8 | ZDA 2:0 9.6 | 3 ml | 20 mg | DMSO | 140 | 100° C. | 12 | No insoluble component | |

| Comparative preparing example | Reaction product Filtrate concentrate | | Note |
|---|---|---|---|
| | (g) | (%) | |
| 1 | 0.21 | 10.5 | No target product produced |
| 2 | 1.44 | 72 | No target product produced |
| 3 | Failed to be concentrated | | No target product produced |
| 4 | — | — | No target product produced |
| 5 | 1.54 | 77 | No target product produced |
| 6 | Solid failed to be obtained | | No target product produced |
| 7 | 1.8 | 90 | No target product produced |
| 8 | Failed to be concentrated | | No target product produced |

ZDA: zinc acrylate
Yield (%) = 100 × (value obtained by dividing each output by molecular weight of cluster)/(theoretical value (mole) of cluster estimated from raw materials)

Comparative Preparing Example 9 for Preparing Zinc Acrylate Oxo Cluster

Zinc acrylate (5.02 g, 24 mmol) and 200 ml of toluene as a solvent were charged into a reaction vessel to dissolve or disperse zinc acrylate in toluene. Into the reaction liquid, 3 ml of water was further added as an additive. The reaction liquid was stirred for 2 hours while refluxing toluene at 110° C. After finishing the reaction, the reaction liquid was filtered to obtain a filtrate. The obtained filtrate was concentrated to obtain a concentrate (0.38 g, 7.6%). The concentrate was analyzed and no target product was confirmed.

Comparative Preparing Example 10 for Preparing Zinc Acrylate Oxo Cluster

Zinc acrylate (2.00 g, 9.6 mmol) and 200 ml of toluene as a solvent were charged into a reaction vessel to dissolve or disperse zinc acrylate in toluene. Into the reaction liquid, 2 ml of water was further added as an additive. The reaction liquid was stirred for 2 hours while refluxing toluene at 110° C. After finishing the reaction, the reaction liquid was filtered to obtain a filtrate. The obtained filtrate was concentrated to obtain a concentrate (0.37 g, 18.6%). The concentrate was analyzed and no target product was confirmed.

Comparative Preparing Example 11 for Preparing Zinc Acrylate Oxo Cluster

Zinc acrylate (2.01 g, 9.7 mmol) and 200 ml of toluene as a solvent were charged into a reaction vessel to dissolve or disperse zinc acrylate in toluene. Into the reaction liquid, 2 ml of water was further added as an additive. The reaction liquid was stirred for 1 hour at 90° C. After finishing the reaction, the reaction liquid was filtered to obtain a filtrate. The obtained filtrate was concentrated to obtain a concentrate (1.07 g, 53.2%). The concentrate was analyzed and no target product was confirmed.

Comparative Preparing Example 12 for Preparing Zinc Acrylate Oxo Cluster

Zinc acrylate (2.04 g, 9.8 mmol) and 200 ml of toluene as a solvent were charged into a reaction vessel to dissolve or disperse zinc acrylate in toluene. Into the reaction liquid, 0.5 ml of water was further added as an additive. The reaction liquid was stirred for 1 hour while refluxing toluene at 110° C. After finishing the reaction, the reaction liquid was filtered to obtain a filtrate. The obtained filtrate was concentrated to obtain a concentrate (1.67 g, 81.7%). The concentrate was analyzed and no target product was confirmed.

Comparative Preparing Example 13 for Preparing Zinc Acrylate Oxo Cluster

Zinc acrylate (2.01 g, 9.7 mmol) and 200 ml of toluene as a solvent were charged into a reaction vessel to dissolve or disperse zinc acrylate in toluene. The reaction liquid was stirred for 1 hour while refluxing toluene at 110° C. After finishing the reaction, the reaction liquid was filtered to obtain a filtrate. The obtained filtrate was concentrated to obtain a concentrate (0.30 g, 14.8%). The concentrate was analyzed and no target product was confirmed.

Comparative Preparing Example 14 for Preparing Zinc Acrylate Oxo Cluster

Zinc acrylate (2.08 g, 10 mmol) and 200 ml of toluene as a solvent were charged into a reaction vessel to dissolve or disperse zinc acrylate in toluene. Into the reaction liquid, 1 ml of water was further added as an additive. The reaction liquid was stirred for 2 hours while refluxing toluene at 110° C. After finishing the reaction, the reaction liquid was filtered to obtain a filtrate. The obtained filtrate was concentrated to obtain a concentrate (0.85 g, 41%). The concentrate was analyzed and no target product was confirmed.

Comparative Preparing Example 15 for Preparing Zinc Acrylate Oxo Cluster

Zinc acrylate (10 g, 4.8 mmol) and 49 ml of toluene as a solvent were charged into a reaction vessel to dissolve or disperse zinc acrylate in toluene. The reaction liquid was stirred for 5 hours while refluxing toluene at 110° C. After finishing the reaction, the reaction liquid was filtered to obtain a filtrate. The obtained filtrate was concentrated to obtain a concentrate (0.26 g, 2.6%). The concentrate was analyzed and a polymer of zinc acrylate was confirmed.

Comparative Preparing Example 16 for Preparing Zinc Acrylate Oxo Duster

Zinc acrylate (10 g, 4.8 mmol) and 49 ml of toluene as a solvent were charged into a reaction vessel to dissolve or disperse zinc acrylate in toluene. The reaction liquid was stirred for 24 hours while refluxing toluene at 110° C. After finishing the reaction, the reaction liquid was filtered to obtain a filtrate. The obtained filtrate was concentrated to obtain a concentrate (0.08 g, 0.8%). The concentrate was analyzed and a polymer of zinc acrylate was confirmed.

Comparative Preparing Example 17 for Preparing Zinc Acrylate Oxo Cluster

Zinc acrylate (10 g, 4.8 mmol) and 97 ml of toluene as a solvent were charged into a reaction vessel to dissolve or disperse zinc acrylate in toluene. The reaction liquid was stirred for 24 hours while refluxing toluene at 110° C. After finishing the reaction, the reaction liquid was filtered to obtain a filtrate. The obtained filtrate was concentrated to obtain a concentrate (0.03 g, 0.3%). The concentrate was analyzed and a polymer of zinc acrylate was confirmed.

Comparative Preparing Example 18 for Preparing Zinc Acrylate Oxo Cluster

Zinc acrylate (10 g, 4.8 mmol) and 97 ml of xylene as a solvent were charged into a reaction vessel to dissolve or disperse zinc acrylate in xylene. The reaction liquid was stirred for 5 hours while refluxing xylene at 110° C. After finishing the reaction, the reaction liquid was filtered to obtain a filtrate. The obtained filtrate was concentrated to obtain a concentrate (0.19 g, 1.9%). The concentrate was analyzed and a polymer of zinc acrylate was confirmed.

The reaction conditions and results of the comparative preparing examples 9 to 18 for preparing zinc acrylate oxo cluster are summarized in Table 3.

TABLE 3

| Comparative preparing example | Material | | Additive Water | Solvent Type | ml | Reaction conditions Temperature (° C.) | Time (h) | Filtrate concentrate (g) | (%) | Note |
|---|---|---|---|---|---|---|---|---|---|---|
| | g | mmol | | | | | | | | |
| 9 | ZDA 5.02 | 24 | 3 ml | Toluene | 200 | Reflux 110° C. | 2 | 0.38 | 7.6 | No target product produced |
| 10 | ZDA 2.00 | 9.6 | 2 ml | Toluene | 200 | Reflux 110° C. | 2 | 0.37 | 18.6 | No target product produced |
| 11 | ZDA 2.01 | 9.7 | 2 ml | Toluene | 200 | 90° C. | 1 | 1.07 | 53.2 | No target product produced |
| 12 | ZDA 2.04 | 9.8 | 0.5 ml | Toluene | 200 | Reflux 110° C. | 1 | 1.67 | 81.7 | No target product produced |
| 13 | ZDA 2.01 | 9.7 | 0 | Toluene | 200 | Reflux. 110° C. | 1 | 0.30 | 14.8 | No target product produced |
| 14 | ZDA 2.08 | 10.0 | 1 ml | Toluene | 200 | Reflux 110° C. | 1 | 0.85 | 41 | No target product produced |
| 15 | ZDA 10 | 4.8 | 0 | Toluene | 49 | Reflux 110° C. | 5 | 0.26 | 2.6 | Polymer of ZDA |
| 16 | ZDA 10 | 4.8 | 0 | Toluene | 49 | Reflux 110° C. | 24 | 0.08 | 0.8 | Polymer of ZDA |
| 17 | ZDA 10 | 4.8 | 0 | Toluene | 97 | Reflux 110° C. | 24 | 0.03 | 0.3 | Polymer of ZDA |
| 18 | ZDA 10 | 4.8 | 0 | Xylene | 97 | Reflux 110° C. | 5 | 0.19 | 1.9 | Polymer of ZDA |

ZDA: zinc acrylate
Yield (%) = 100 × (value obtained by dividing each output by molecular weight of cluster)/(theoretical value (mole) of cluster estimated from raw materials)

Inventive Preparing Example 1

In an argon atmosphere, zinc oxide (1.0 g, 12.3 mmol), zinc acrylate (7.01 g, 33.8 mmol), zinc stearate (1.94 g, 3.1 mmol) and 150 ml of chloroform were charged into a reaction vessel. The mixture was stirred at 64° C. for 3 hours. It is noted that the solvent was refluxed. The obtained reaction liquid was filtered to remove the insoluble precipitate in the solvent. 75 ml of hexane was added into the filtrate, and concentration under reduced pressure was performed until the liquid amount was reduced to about one-fourth, to obtain a precipitate. The precipitate was removed by filtration, and the filtrate was concentrated and dried to obtain a product 11 (9.9 g, yield 99%). Zinc oxide used above was available from Kishida Chemical Co. Ltd., zinc acrylate used above was available from Sigma-Aldrichi Corporation, and zinc stearate used above was available from Wako Pure Chemical Industries, Ltd.

Inventive Preparing Example 2

In an argon atmosphere, zinc oxide (160 g, 1966 mmol), zinc acrylate (1122 g, 5406 mmol), zinc stearate (311 g, 491 mmol) and 24 L of chloroform were charged into a reaction vessel. The mixture was stirred at 64° C. for 18 hours. It is noted that the solvent was refluxed. The reaction liquid was cooled to 35° C. or below, 12 L of hexane was added therein, and the resultant liquid was stirred for 10 minutes. The obtained reaction liquid was filtered to remove the insoluble precipitate in the solvent. The filtrate was concentrated and dried to obtain a product 12 (1520 g, yield 95%). Zinc acrylate used above was available from Sigma-Aldrichi Corporation, and zinc oxide and zinc stearate used above was available from Wako Pure Chemical Industries, Ltd.

Inventive Preparing Example 3

In an argon atmosphere, zinc oxide (1.0 g, 12.3 mmol), zinc acrylate (6.37 g, 30.7 mmol), zinc stearate (3.88 g, 6.1 mmol) and 150 ml of chloroform were charged into a reaction vessel. The mixture was stirred at 64° C. for 3 hours. It is noted that the solvent was refluxed. The reaction liquid was cooled to 35° C. or below, 75 ml of hexane was added therein, and the resultant liquid was stirred for 10 minutes. The obtained reaction liquid was filtered to remove the insoluble precipitate in the solvent. The filtrate was concentrated and dried to obtain a product 13 (10.3 g, yield 91%). Zinc acrylate used above was available from Sigma-Aldrichi Corporation, and zinc oxide and zinc stearate used above was available from Wako Pure Chemical Industries, Ltd.

Inventive Preparing Example 4

In an argon atmosphere, zinc oxide (1.0 g, 12.3 mmol), zinc acrylate (6.37 g, 30.7 mmol), zinc stearate (3.88 g, 6.1 mmol) and 150 ml of ethyl acetate were charged into a reaction vessel. The mixture was stirred at 77° C. for 3 hours. It is noted that the solvent was refluxed. The reaction liquid was cooled to 35° C. or below, 75 ml of hexane was added therein, and the resultant liquid was stirred for 10 minutes. The obtained reaction liquid was filtered to remove the insoluble precipitate in the solvent. The filtrate was concentrated and dried to obtain a product 14 (6.1 g, yield 54%). Zinc acrylate used above was available from Sigma-Aldrichi Corporation, and zinc oxide and zinc stearate used above was available from Wako Pure Chemical Industries, Ltd.

Inventive Preparing Example 5

In an argon atmosphere, zinc oxide (3.0 g, 36.9 mmol), zinc acrylate (21.03 g, 101.4 mmol), zinc undecylenate (3.98 g, 9.2 mmol) and 450 ml of chloroform were charged into a reaction vessel. The mixture was stirred at 64° C. for 3 hours. It is noted that the solvent was refluxed. The reaction liquid was cooled to 35° C. or below, 225 ml of hexane was added therein, and the resultant liquid was stirred for 10 minutes. The obtained reaction liquid was filtered to remove the insoluble precipitate in the solvent. The filtrate was concentrated and dried to obtain a product 15 (27.5 g, yield 98%). Zinc oxide used above was available from Wako Pure Chemical Industries, Ltd, zinc acrylate used above was available from Sigma-Aldrichi Corporation, and zinc undecylenate used above was available from Nitto Kasei Co. Ltd.

Inventive Preparing Example 6

In an argon atmosphere, zinc oxide (3.0 g, 36.9 mmol), zinc acrylate (21.03 g, 101.4 mmol), zinc laurate (4.28 g, 9.2 mmol) and 450 ml of chloroform were charged into a reaction vessel. The mixture was stirred at 64° C. for 3 hours. It is noted that the solvent was refluxed. The reaction liquid was cooled to 35° C. or below, 225 ml of hexane was added therein, and the resultant liquid was stirred for 10 minutes. The obtained reaction liquid was filtered to remove the insoluble precipitate in the solvent. The filtrate was concentrated and dried to obtain a product 16 (27.6 g, yield 98%). Zinc oxide used above was available from Wako Pure Chemical Industries, Ltd, zinc acrylate used above was available from Sigma-Aldrichi Corporation, and zinc laurate used above was available from Nitto Kasei Co. Ltd.

Inventive Preparing Example 7

In an argon atmosphere, zinc oxide (3.0 g, 36.9 mmol), zinc acrylate (21.03 g, 101.4 mmol), zinc octanoate (3.24 g, 9.2 mmol) and 450 ml of chloroform were charged into a reaction vessel. The mixture was stirred at 64° C. for 3 hours. It is noted that the solvent was refluxed. The reaction liquid was cooled to 35° C. or below, 225 ml of hexane was added therein, and the resultant liquid was stirred for 10 minutes. The obtained reaction liquid was filtered to remove the insoluble precipitate in the solvent. The filtrate was concentrated and dried to obtain a product 17 (26.7 g, yield 98%). Zinc oxide used above was available from Wako Pure Chemical Industries, Ltd, zinc acrylate used above was available from Sigma-Aldrichi Corporation, and zinc octanoate used above was available from Nitto Kasei Co. Ltd.

Inventive Preparing Example 8

In an argon atmosphere, zinc oxide (3.0 g, 36.9 mmol), zinc acrylate (21.03 g, 101.4 mmol), zinc behenate (6.86 g, 9.2 mmol) and 450 ml of chloroform were charged into a reaction vessel. The mixture was stirred at 64° C. for 3 hours. It is noted that the solvent was refluxed. The reaction liquid was cooled to 35° C. or below, 225 ml of hexane was added therein, and the resultant liquid was stirred for 10 minutes. The obtained reaction liquid was filtered to remove the insoluble precipitate in the solvent. The filtrate was concentrated and dried to obtain a product 18 (26.7 g, yield 86%). Zinc oxide used above was available from Wako Pure Chemical Industries, Ltd, zinc acrylate used above was available from Sigma-Aldrichi Corporation, and zinc behenate used above was available from Nitto Kasei Co. Ltd.

The preparing conditions and results of the inventive preparing examples 1 to 8 are summarized in Table 4.

Figure 7:
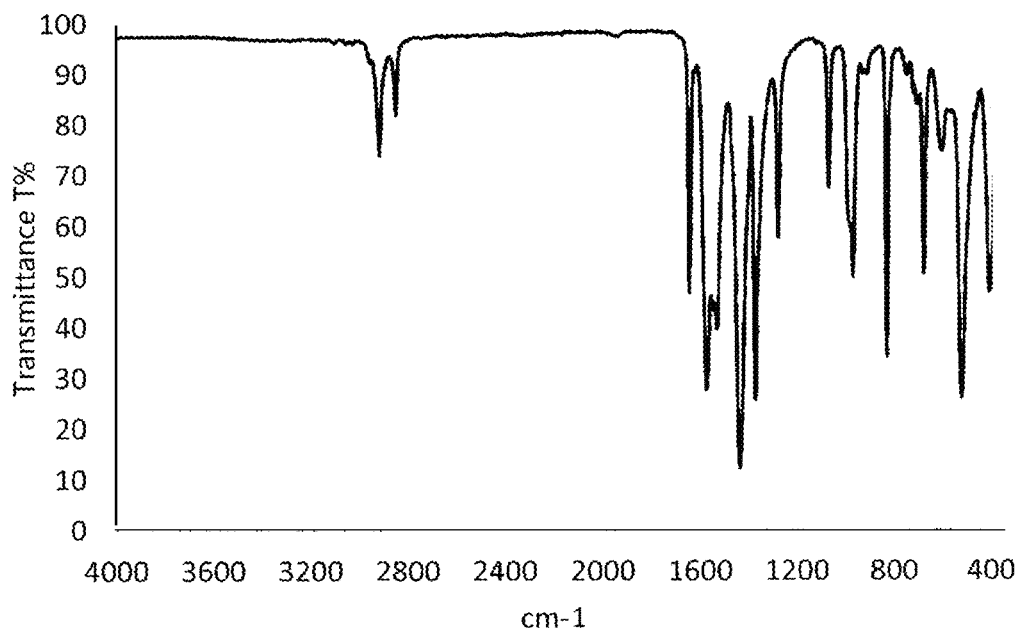
FIG. 7 shows IR spectrum of a preferable complex according to the present invention.

FIG. 7 shows IR spectrum of the product 11.

Figure 8:
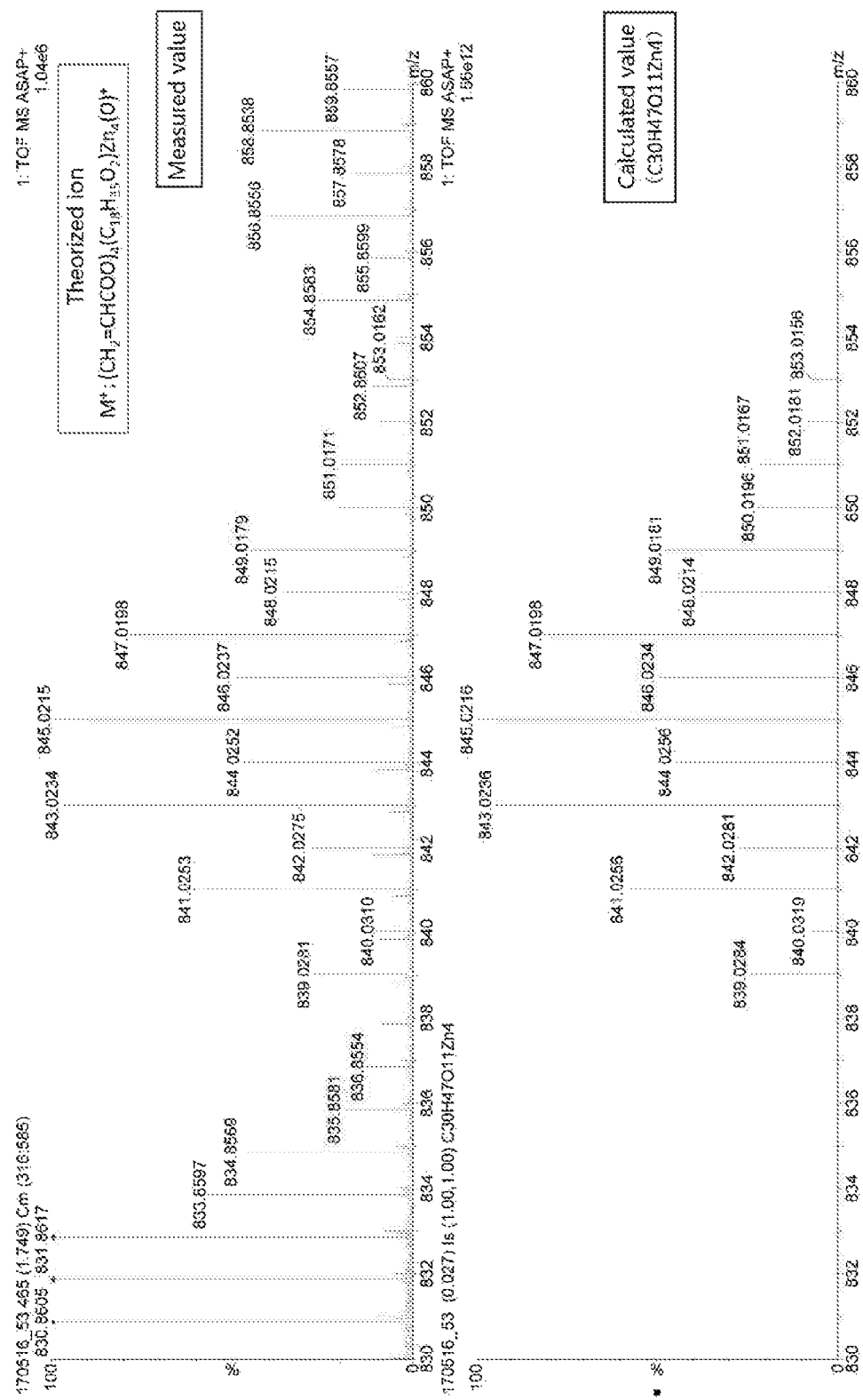
FIG. 8 shows ASAP-MS spectrum of a preferable complex according to the present invention.

FIG. 8 shows ASAP-MS spectrum of the product 11. ASAP-MS spectrum simulation pattern of $C_{30}H_{47}O_{11}Zn_4$, i.e. cation $Zn_4O(OCOCHCH_2)_4(OCOC_{17}H_{35})^+$ theorized from $Zn_4O(OCOCHCH_2)_5(OCOC_{17}H_{35})$ is also shown. As shown in FIG. 8, the ASAP-MS spectrum has the same pattern as the simulation pattern. Further, the obtained experimental value m/z 845.0215 is very close to the estimated value m/z 845.0216 for the cation $(Zn_4O(OCOCHCH_2)_4(OCOC_{17}H_{35})^+)$.

TABLE 4

| Inventive example | Molar ratio of acrylate to carboxylic acid | Zinc oxide (0.02 μm) | | Zinc acrylate | | Zinc carboxylate | | Reaction condition | | | Result | |
|---|---|---|---|---|---|---|---|---|---|---|---|---|
| | | (g) | (mmol) | (g) | (mmol) | (g) | (mmol) | Reaction | Temperature (° C.) | Time (h) | Output (g) | Yield (%) |
| 1 | 5.5:0.5 | 1.0 | 12.3 | 7.01 | 33.8 | Zinc stearate 1.94 | 3.1 | CHCl₃ 150 ml | 64 | 3 | 9.9 | 99 |
| 2 | 5.5:0.5 | 160 | 1966 | 1122 | 5406 | Zinc stearate 311 | 491 | CHCl₃ 24 L | 64 | 18 | 1520 | 95 |
| 3 | 5:1 | 1.0 | 12.3 | 6.37 | 30.7 | Zinc stearate 3.88 | 6.1 | CHCl₃ 150 ml | 64 | 3 | 10.3 | 91 |
| 4 | 5:1 | 1.0 | 12.3 | 6.37 | 30.7 | Zinc stearate 3.88 | 6.1 | EtOAc 150 ml | 77 | 3 | 64 | 54 |
| 5 | 5.5:0.5 | 3.0 | 36.9 | 21.03 | 101.4 | Zinc undecylenate 3.98 | 9.2 | CHCl₃ 450 ml | 64 | 3 | 27.5 | 98 |
| 6 | 5.5:0.5 | 3.0 | 36.9 | 21.03 | 101.4 | Zinc laurate 4.28 | 9.2 | CHCl₃ 450 ml | 64 | 3 | 27.6 | 98 |
| 7 | 5.5:0.5 | 3.0 | 36.9 | 21.03 | 101.4 | Zinc octanoate 3.24 | 9.2 | CHCl₃ 450 ml | 64 | 3 | 26.7 | 98 |
| 8 | 5.5:0.5 | 3.0 | 36.9 | 21.03 | 101.4 | Zinc behenate 6.86 | 9.2 | CHCl₃ 450 ml | 64 | 3 | 26.7 | 86 |

Comparative Preparing Example 1

In an argon atmosphere, zinc oxide (1.0 g, 12.3 mmol), zinc acrylate (6.37 g, 30.7 mmol), zinc stearate (3.88 g, 6.1 mmol) and 150 ml of tetrahydrofuran were charged into a reaction vessel. The mixture was stirred at 66° C. for 3 hours. After the reaction was terminated, the reaction liquid was filtered to obtain a filtrate. The obtained filtrate was concentrated to obtain a concentrate. The concentrate was analyzed and no target product was confirmed. Zinc oxide used above was available from Kishida Chemical Co. Ltd., zinc acrylate used above was available from Sigma-Aldrichi Corporation, and zinc stearate used above was available from Wako Pure Chemical Industries, Ltd.

Comparative Preparing Example 2

In an argon atmosphere, zinc oxide (1.0 g, 12.3 mmol), zinc acrylate (6.37 g, 30.7 mmol), zinc stearate (3.88 g, 6.1 mmol) and 150 ml of toluene were charged into a reaction vessel. The mixture was stirred at 110° C. for 3 hours. After the reaction was terminated, the reaction liquid was filtered to obtain a filtrate. The obtained filtrate was concentrated to obtain a concentrate. The concentrate was analyzed and no target product was confirmed. Zinc oxide used above was available from Kishida Chemical Co. Ltd., zinc acrylate used above was available from Sigma-Aldrichi Corporation, and zinc stearate used above was available from Wako Pure Chemical Industries, Ltd.

[Preparation of Rubber Composition]

According to the formulations shown in Table 5, materials were kneaded to prepare rubber compositions. It is noted that the material temperature when kneading the rubber compositions was 100° C. to 130° C. The obtained rubber compositions were each molded into a slab at 170° C. for 20 minutes and at 230° C. for 5 minutes, respectively.

TABLE 5

| Rubber composition No. | | | 1 | 2 | 3 | 4 | 5 | 6 |
|---|---|---|---|---|---|---|---|---|
| Formulation (parts by mass) | | BR730 | 100 | 100 | 100 | 100 | 100 | 100 |
| | | ZN-DA90S | — | — | — | 20 | 25 | — |
| | | Stearic acid coordinated metal cluster | 25.3 | 28.7 | 32.2 | — | — | — |
| | | Zinc acrylate oxo cluster | — | — | — | — | — | 25.2 |
| | | ZnO | 5 | 5 | 5 | 5 | 5 | 5 |
| | | DCP | 0.8 | 0.8 | 0.8 | 0.8 | 0.8 | 0.8 |
| Converted amount based on zinc acrylate (parts by mass) | | | 17.8 | 20.2 | 22.6 | 18 | 22.5 | 22.5 |
| Sab properties (170° C. molding) | Hardness | Shore C hardness | 60.8 | 65.8 | 68.8 | 63.7 | 72.2 | 65.6 |
| | Rebound resilience | (%) | 78.4 | 76.5 | 73.8 | 75.3 | 70.8 | 74.2 |
| | Reaction ratio | (%) | 92.2 | 92.2 | 91.8 | 86.8 | 87.2 | 88.6 |
| Sab properties (230° C. molding) | Hardness | Shore C hardness | 49.6 | 52.8 | 56.7 | 52.7 | 58.7 | 58.7 |
| | Rebound resilience | (%) | 83.6 | 81.6 | 80.2 | 80.5 | 76.6 | 76.6 |

The materials used in Table 5 are shown as follows.

BR730: high-cis polybutadiene (amount of cis-1,4 bond=96 mass %, amount of 1,2-vinyl bond=1.3 mass %, Moony viscosity ($ML_{1+4}$ (100° C.)=55, molecular weight distribution (Mw/Mn)=3) available from JSR Corporation Stearic acid coordinated metal cluster: the product 12 obtained in the inventive preparing example 2

ZN-DA90S: zinc acrylate (a product coated with zinc stearate in an amount of 10 mass %) available from Nisshoku Techno Fine Chemical Co., Ltd.

ZnO (zinc oxide): "Ginrei R" available from Toho Zinc Co., Ltd.

Figure 9:
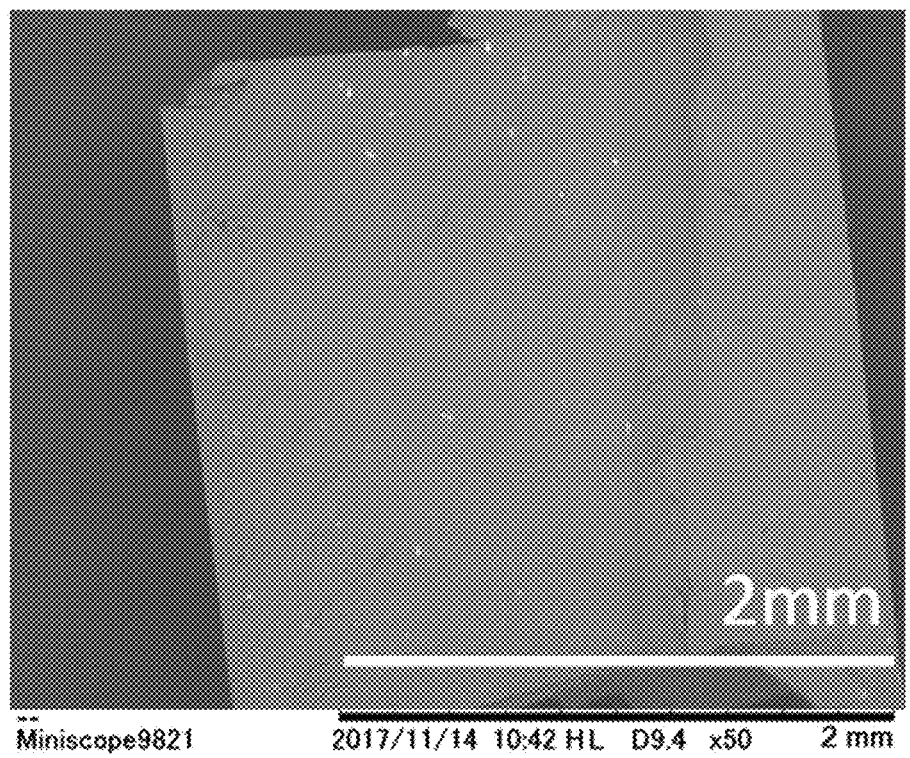
FIG. 9 shows SEM photograph (50 folds amplified) of a slab formed from the rubber composition No. 2 (photograph in substitution for figure)
Figure 10:
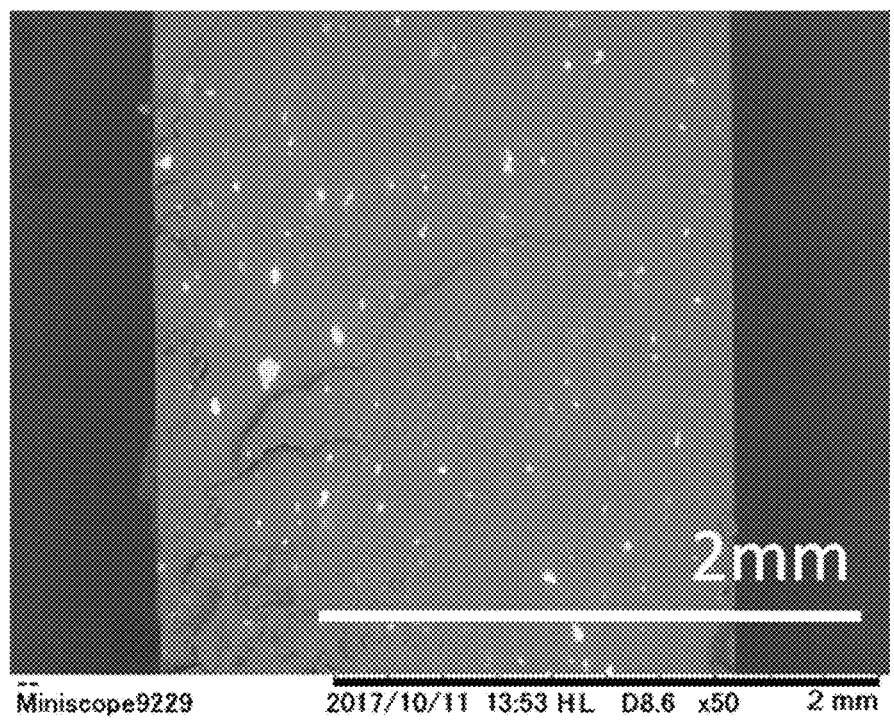
FIG. 10 shows SEM photograph (50 folds amplified) of a slab formed from the rubber composition No. 6 (photograph in substitution for figure)
Figure 11:
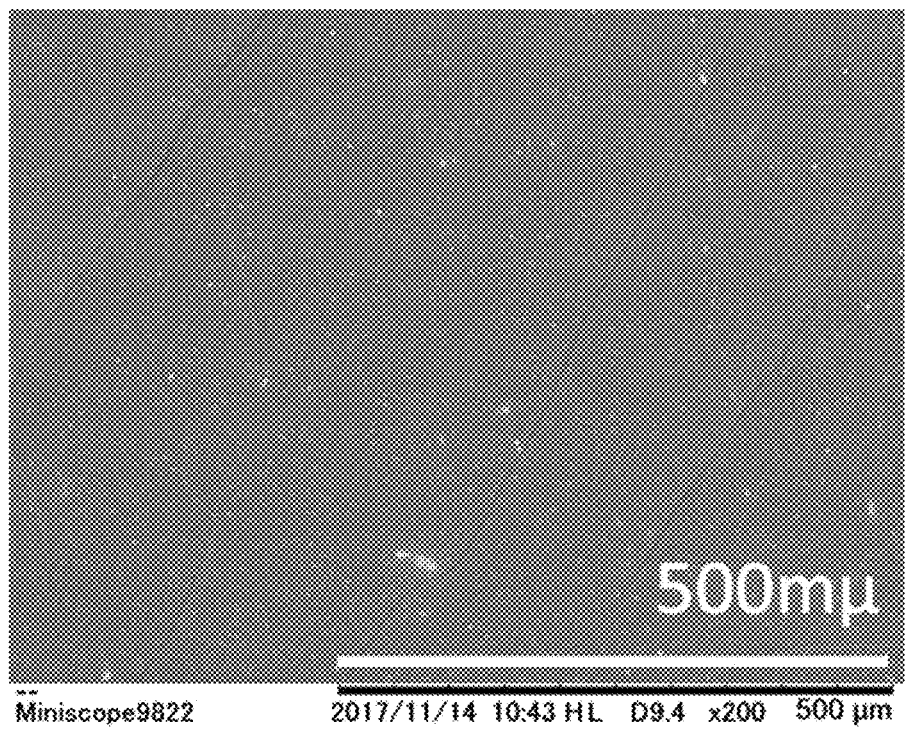
FIG. 11 shows SEM photograph (200 folds amplified) of a slab formed from the rubber composition No. 2 (photograph in substitution for figure)
Figure 12:
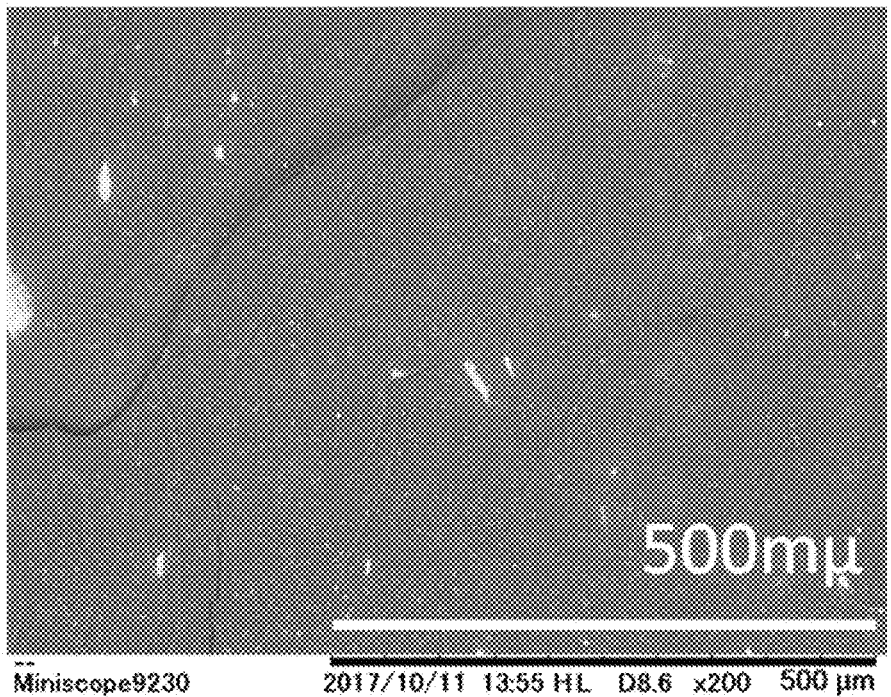
FIG. 12 shows SEM photograph (200 folds amplified) of a slab formed from the rubber composition No. 6 (photograph in substitution for figure).

DCP (Dicumyl peroxide): "Percumyl (register trademark) D" available from NOF Corporation FIG. 9 shows SEM photograph (50 folds amplified) of the slab formed from the rubber composition No. 2, FIG. 10 shows SEM photograph (50 folds amplified) of the slab formed from the rubber composition No. 6, FIG. 11 shows SEM photograph (200 folds amplified) of the slab formed from the rubber composition No. 2, and FIG. 12 shows SEM photograph (200 folds amplified) of the slab formed from the rubber composition No. 6. It can be seen from these results that the stearic acid coordinated metal cluster used in the rubber composition No. 2 has better dispersibility in the rubber than the zinc acrylate oxo cluster used in the rubber composition No. 6.

Table 5 also shows the hardness and rebound resilience of the slabs formed from the rubber compositions. It can be seen from the results that the crosslinked rubber molded products (slabs) using the complex according to the present invention each exhibits a higher resilience to hardness, a higher acrylate reaction ratio and a more efficient crosslinking reaction than that using zinc acrylate as a co-crosslinking agent.

The complex according to the present invention is useful, for example, as a co-crosslinking agent. The at least two carbon-carbon double bonds of the complex can crosslink a compound having an ethylenically unsaturated bond. In particular, the complex according to the present invention is useful as a co-crosslinking agent of a rubber composition, paint composition, adhesive composition, or the like. In particular, the complex according to the present invention has excellent dispersibility in the rubber composition.

This application is based on Japanese patent application No. 2018-120087 filed on Jun. 25, 2018, the content of which is hereby incorporated by reference.

The invention claimed is:

1. A complex represented by a formula (1):

$$[M_4O(RCOO)_6]_n \quad (1)$$

wherein in the formula (1), M is zinc, at least two of R are —CH=$CH_2$ or —C($CH_3$)=$CH_2$, and at least one of R is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group, and n is an integer of 1 to 8.

2. The complex according to claim 1, wherein in the formula (1), at least four of R are —CH=$CH_2$ or —C($CH_3$)=$CH_2$, and the rest of R is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

3. A complex represented by a structural formula (2):

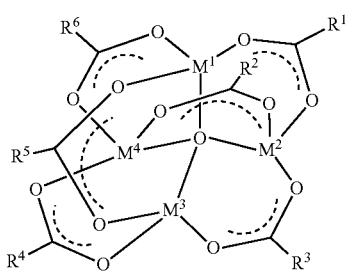

(2)

wherein in the structural formula (2), $M^1$ to $M^4$ are zinc, at least two of $R^1$ to $R^6$ are —CH=CH$_2$ or —C(CH$_3$)=CH$_2$, and at least one of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

4. The complex according to claim 3, wherein three of $R^1$ to $R^6$ are —CH=CH$_2$ or —C(CH$_3$)=CH$_2$, and the rest of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

5. The complex according to claim 3, wherein four of $R^1$ to $R^6$ are —CH=CH$_2$ or —C(CH$_3$)=CH$_2$, and the rest of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

6. The complex according to claim 3, wherein five of $R^1$ to $R^6$ are —CH=CH$_2$ or —C(CH$_3$)=CH$_2$, and the rest of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

7. A process for preparing a complex, comprising a step of reacting
zinc acrylate and/or zinc methacrylate (3-1);
a zinc salt (3-2) of a saturated fatty acid selected from the group consisting of octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and henicosanoic acid; and
zinc oxide (4);
wherein the complex is represented by a formula (1):

$$[M_4O(RCOO)_6]_n \quad (1)$$

wherein in the formula (1), M is zinc, at least two of R are —CH=CH$_2$ or —C(CH$_3$)=CH$_2$, and at least one of R is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group, and n is an integer of 1 to 8.

8. The process for preparing the complex according to claim 7, wherein at least one member selected from the group consisting of tetrachloromethane, chloromethane, 1,1-dichloroethane, 1,2-dichloroethane, 1,1,2,2-tetrachloroethane, dibromomethane, tetrachloroethylene, trichloroethylene and chloroform is used as the solvent.

9. The process for preparing the complex according to claim 7, wherein a molar ratio (((3-1)+(3-2))/(4)) of the zinc acrylate and/or zinc methacrylate (3-1) and the zinc salt (3-2) of the saturated fatty acid to the zinc oxide (4) ranges from 3/2 to 5/1.

10. The process for preparing the complex according to claim 7, wherein the reaction is conducted at a temperature in a range from −20° C. to 100° C.

11. The process for preparing the complex according to claim 7, wherein a complex represented by a structural formula (2) is prepared:

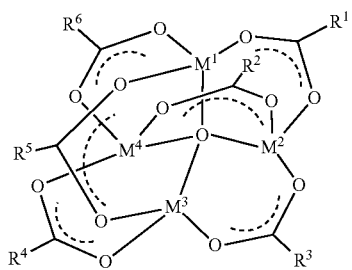

(2)

wherein in the structural formula (2), $M^1$ to $M^4$ are zinc, at least two of $R^1$ to $R^6$ are —CH=CH$_2$ or —C(CH$_3$)=CH$_2$, and at least one of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

12. The process for preparing the complex according to claim 11, wherein in the structural formula (2), three of $R^1$ to $R^6$ are —CH=CH$_2$ or —C(CH$_3$)=CH$_2$, and the rest of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

13. The process for preparing the complex according to claim 11, wherein in the structural formula (2), four of $R^1$ to $R^6$ are —CH=CH$_2$ or —C(CH$_3$)=CH$_2$, and the rest of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

14. The process for preparing the complex according to claim 11, wherein in the structural formula (2), five of $R^1$ to $R^6$ are —CH=CH$_2$ or —C(CH$_3$)=CH$_2$, and the rest of $R^1$ to $R^6$ is an alkyl group selected from the group consisting of heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group.

15. The process for preparing the complex according to claim 7, wherein the zinc salt (3-2) of the saturated fatty acid is at least one member selected from the group consisting of zinc octanoate, zinc laurate, zinc stearate and zinc behenate.

16. The process for preparing the complex according to claim 7, wherein a molar ratio ((3-1)/(3-2)) of zinc acrylate and/or zinc methacrylate (3-1) to the zinc salt (3-2) of the saturated fatty acid ranges from 1/20 to 100/1.

* * * * *